US011571675B2

(12) United States Patent
Mitra et al.

(10) Patent No.: US 11,571,675 B2
(45) Date of Patent: Feb. 7, 2023

(54) METHOD AND APPARATUS FOR FABRICATING HIGH PERFORMANCE OPTOELECTRONIC DEVICES

(71) Applicant: KING ABDULLAH UNIVERSITY OF SCIENCE AND TECHNOLOGY, Thuwal (SA)

(72) Inventors: Somak Mitra, Thuwal (SA); Iman S. Roqan, Thuwal (SA); Yusin Pak, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 575 days.

(21) Appl. No.: 16/613,233

(22) PCT Filed: May 17, 2018

(86) PCT No.: PCT/IB2018/053484
§ 371 (c)(1),
(2) Date: Nov. 13, 2019

(87) PCT Pub. No.: WO2018/215893
PCT Pub. Date: Nov. 29, 2018

(65) Prior Publication Data
US 2020/0197897 A1      Jun. 25, 2020

Related U.S. Application Data

(60) Provisional application No. 62/632,296, filed on Feb. 19, 2018, provisional application No. 62/511,831, filed on May 26, 2017.

(51) Int. Cl.
*B01J 19/12*      (2006.01)
*B01J 19/00*      (2006.01)
(Continued)

(52) U.S. Cl.
CPC ......... *B01J 19/121* (2013.01); *B01J 19/0006* (2013.01); *B01J 19/2445* (2013.01);
(Continued)

(58) Field of Classification Search
CPC .. B01J 19/121; B01J 19/0006; B01J 19/2445; B01J 2219/00038; B01J 2219/0801;
(Continued)

(56) References Cited

U.S. PATENT DOCUMENTS

2010/0196192 A1    8/2010   Liu et al.
2015/0299861 A1    10/2015  Leconte et al.

FOREIGN PATENT DOCUMENTS

WO      2010073388 A1     7/2010

OTHER PUBLICATIONS

English Translation of WO2010073388 (Year: 2010).*
(Continued)

*Primary Examiner* — Andrew J. Oyer
(74) *Attorney, Agent, or Firm* — Patent Portfolio Builders PLLC

(57) ABSTRACT

Methods, apparatuses, and systems are provided for using laser ablation to manufacture nanoparticles. An example method includes steps of generating, by a laser beam generator, a laser beam, splitting, by a set of beam splitters, the laser beam into a plurality of derivative laser beams, and directing each derivative laser beam towards a plurality of targets. In this example method, the plurality of targets are submerged in corresponding synthesis solvents within corresponding synthesis chambers. Moreover, interaction of each derivative laser beam with its corresponding target releases nanoparticles into the corresponding synthesis solvent to create a nanoparticle solution including both the corresponding synthesis solvent and the released nanoparticles.

20 Claims, 33 Drawing Sheets

(51) Int. Cl.
    *B01J 19/24*     (2006.01)
    *C01G 9/02*     (2006.01)
    *B82Y 30/00*     (2011.01)
    *B82Y 40/00*     (2011.01)
    *G01J 1/42*     (2006.01)

(52) U.S. Cl.
    CPC ....... *C01G 9/02* (2013.01); *B01J 2219/00038* (2013.01); *B01J 2219/0801* (2013.01); *B01J 2219/0877* (2013.01); *B01J 2219/12* (2013.01); *B82Y 30/00* (2013.01); *B82Y 40/00* (2013.01); *C01P 2004/03* (2013.01); *C01P 2004/04* (2013.01); *C01P 2004/64* (2013.01); *G01J 1/429* (2013.01)

(58) Field of Classification Search
    CPC ............ B01J 2219/0877; B01J 2219/12; B01J 2219/00306; B01J 2219/00441; B01J 2219/0075; B01J 19/0046; C01G 9/02; B82Y 30/00; B82Y 40/00; C01P 2004/03; C01P 2004/04; C01P 2004/64; G01J 1/429
    See application file for complete search history.

(56) References Cited

OTHER PUBLICATIONS

Horoz, S. et al. "CdSe Quantum Dots Synthesized by Laser Ablation in Water and Their Photovoltaic Applications," Applied Physics Letters, Nov. 27, 2012, vol. 101, pp. 223901-1-228901-4.

International Search Report in corresponding/related International Application No. PCT/IB2018/053484, dated Aug. 31, 2018.

Written Opinion of the International Searching Authority in corresponding/related International Application No. PCT/IB2018/053484, dated Aug. 31, 2018.

Chau, J.L.H., et al., "Fabrication of ZnO Thin Films by Femtosecond Pulsed Laser Deposition," Optics & Laser Technology, May 5, 2010, vol. 42, No. 8, pp. 1337-1339.

Chau, J.L.H., et al., "Facile Synthesis of Bimetallic Nanoparticles by Femtosecond Laser Irradiation Method," Arabian Journal of Chemistry, Apr. 18, 2013, vol. 10, pp. S1395-S1401.

Chau, J.L.H., et al., "Femtosecond Laser Synthesis of Bimetallic Pt—Au Nanoparticles," Materials Letters, Nov. 3, 2010, vol. 65, No. 4, pp. 804-807.

Gondal, M. A., et al., Synthesis of $ZnO_2$ Nanoparticles by Laser Ablation in Liquid and Their Annealing Transformation into ZnO Nanoparticles, Applied Surface Science, Aug. 11, 2009, vol. 256, No. 1, pp. 298-304.

Muñetón Arboleda, D., et al., "Synthesis of Ni Nanoparticles by Femtosecond Laser Ablation in Liquids: Structure and Sizing," The Journal of Physical Chemistry C, May 13, 2015, vol. 119, No. 23, pp. 13184-13193.

Nakamura, T., et al., "Fabrication of Platinum Particles by Intense, Femtosecond Laser Pulse Irradiation of Aqueous Solution," Applied Surface Science, Apr. 21, 2009, vol. 255, No. 24, pp. 9630-9633.

Reif, J., "Basic Physics of Femtosecond Laser Ablation," Laser-Surface Interactions for New Materials Production, Springer Series in Materials Science 130, Dec. 1, 2009, pp. 19-41.

Tan, D., et al., "Preparation of Functional Nanomaterials with Femtosecond Laser Ablation in Solution," Journal of Photochemistry and Photobiology C: Photochemistry Reviews, Aug. 30, 2013, vol. 17, pp. 50-68.

Zhang, Q., et al., "Solution-Processed Graphene Quantum Dot Deep-UV Photodetectors," ACS Nano, Jan. 27, 2015, vol. 9, No. 2, pp. 1561-1570.

* cited by examiner

| Cluster | E' (eV) |
|---|---|
| Zn₁₂O₁₂ | 5.40 |
| Zn₁₂O₁₁C₁ | 2.92 |
| Zn₁₂O₁₀C₂ | 1.88 |

METHOD AND APPARATUS FOR FABRICATING HIGH PERFORMANCE OPTOELECTRONIC DEVICES

CROSS-REFERENCE TO RELATED APPLICATIONS

This application is a U.S. National Stage Application of International Application No. PCT/IB2018/053484, filed on May 17, 2018, which claims priority and benefit from U.S. Provisional Application No. 62/632,296, filed Feb. 19, 2018, and U.S. Provisional Application No. 62/511,831, filed May 26, 2017, the entire contents of which are incorporated herein by reference.

TECHNOLOGICAL FIELD

Embodiments of the invention relate, generally, to fabrication of high performance devices (e.g., optoelectronic devices), and in particular, to the generation of nanoparticles used in high performance devices through the use of femtosecond laser ablation.

BACKGROUND

Various systems are configured to use laser ablation techniques to fabricate nanomaterials or nano structures (which are also referred to herein as nanoparticles). Applicant has identified a number of deficiencies and problems associated with existing approaches. Through applied effort, ingenuity, and innovation, many of these identified problems have been solved by developing solutions that are included in various embodiments of the present invention, many examples of which are described in detail below.

BRIEF SUMMARY

Embodiments described herein relate generally to the fabrication of high performance optoelectronic devices. In particular, these embodiments relate to the synthesis of nanoparticles (such as quantum dots) from material targets using femtosecond laser ablation. These nanoparticles may then be put to a variety of uses in a variety of settings (such as in the manufacture of high performance optoelectronic devices).

In a first example embodiment, a method is provided for synthesizing and manufacturing nanoparticles from a plurality of targets. The method includes generating, by a laser beam generator, a laser beam; and directing portions of the laser beam towards the plurality of targets, each of the plurality of targets being submerged in a corresponding synthesis solvent, wherein interaction of each portion of the laser beam with a corresponding target of the plurality of targets releases nanoparticles into the corresponding synthesis solvent to create a nanoparticle solution including both synthesis solvent and released nanoparticles.

In another example embodiment, the laser beam has a wavelength ranging from ultraviolet radiation to infrared radiation, and a pulse repetition rate ranging from KHz to MHz. In another example embodiment, the plurality of targets are selected from the group consisting of organic material and inorganic material.

In another example embodiment, the method further includes splitting, by a set of beam splitters, the laser beam into the portions of the laser beam, and each portion of the laser beam is directed towards its corresponding target by one or more of the set of beam splitters. In another example embodiment, each of the plurality of targets is in a corresponding synthesis chamber.

In another example embodiment, the method further includes collecting, in a collection chamber, nanoparticle solution from at least one of the plurality of synthesis chambers.

In another example embodiment, the method further includes depositing the collected nanoparticle solution on a substrate. In another example embodiment, depositing the collected nanoparticle solution on a substrate includes spray-coating, dip-coating, or spin-coating the substrate with the nanoparticle solution.

In some embodiments, the method further includes transmitting at least a portion of the liquid from the collection chamber to an evaporation chamber, and evaporating the solvent from the nanoparticle solution in the evaporation chamber to leave a nanoparticle powder residue.

In some embodiments, the method further includes, for each synthesis chamber, receiving an indication of a desired liquid level of the synthesis chamber, detecting, via a level sensor, an actual liquid level of the synthesis chamber, and in an instance in which the actual liquid level of the synthesis chamber is below the desired liquid level, adjusting a release valve associated with the synthesis chamber to cause synthesis solvent to flow into the synthesis chamber until the actual liquid level of the synthesis chamber reaches the desired liquid level.

In some embodiments, the method further includes monitoring, using a power meter, a power of the laser beam, and in an instance in which the power of the laser beam deviates from a target power level by a predetermined threshold, adjusting, by the laser beam generator, the power of the laser beam until the power of the laser beam matches the target power level.

In a second example embodiments, a system is provided for synthesizing and manufacturing nanoparticles from a plurality of targets. The system includes a laser beam generator configured to generate a laser beam, a plurality of synthesis chambers, each housing a target submerged in a synthesis solvent, and a set of beam splitters arranged to split a laser beam generated by the laser beam generator into a plurality of derivative laser beam portions directed towards corresponding targets. The interaction of each derivative laser beam with its corresponding target releases nanoparticles into the corresponding synthesis solvent to create a nanoparticle solution including both the corresponding synthesis solvent and the released nanoparticles.

In some embodiments of the system, the laser beam has a wavelength ranging from ultraviolet radiation to infrared radiation and a pulse repetition rate ranging from kHz to MHz.

In some embodiments, the plurality of targets are selected from the group consisting of organic material and inorganic material.

In some embodiments, the system further includes a collection chamber connected to one or more of the synthesis chambers to receive nanoparticle solution from at least one of the plurality of synthesis chambers. In this regard, the system may further include components designed for depositing the collected nanoparticle solution on a substrate. In some such embodiments, the components designed for depositing the collected nanoparticle solution on a substrate comprise components designed for spray-coating, dip-coating, or spin-coating the substrate with the nanoparticle solution.

In some embodiments, the system includes an evaporation chamber configured to evaporate solvent from a nanoparticle solution to leave a nanoparticle powder residue, the evaporation chamber connected to at least one of the plurality of synthesis chambers by a conduit controlled by a collection end valve.

In some embodiments, the system further includes a memory storing an indication of a desired liquid level of each synthesis chamber, and each particular synthesis chamber includes a level sensor configured to detect an actual liquid level of the particular synthesis chamber, and a release value configured to cause synthesis solvent to flow into the particular synthesis chamber until the actual liquid level of the particular synthesis chamber reaches a corresponding desired liquid level.

In some embodiments, the system includes a power meter disposed in a position enabling the power meter to monitor a power of the laser beam, wherein the laser beam generator is further configured to, in an instance in which the power of the laser beam deviates from a target power level by a predetermined threshold, adjust the power of the laser beam until the power of the laser beam matches the target power level.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
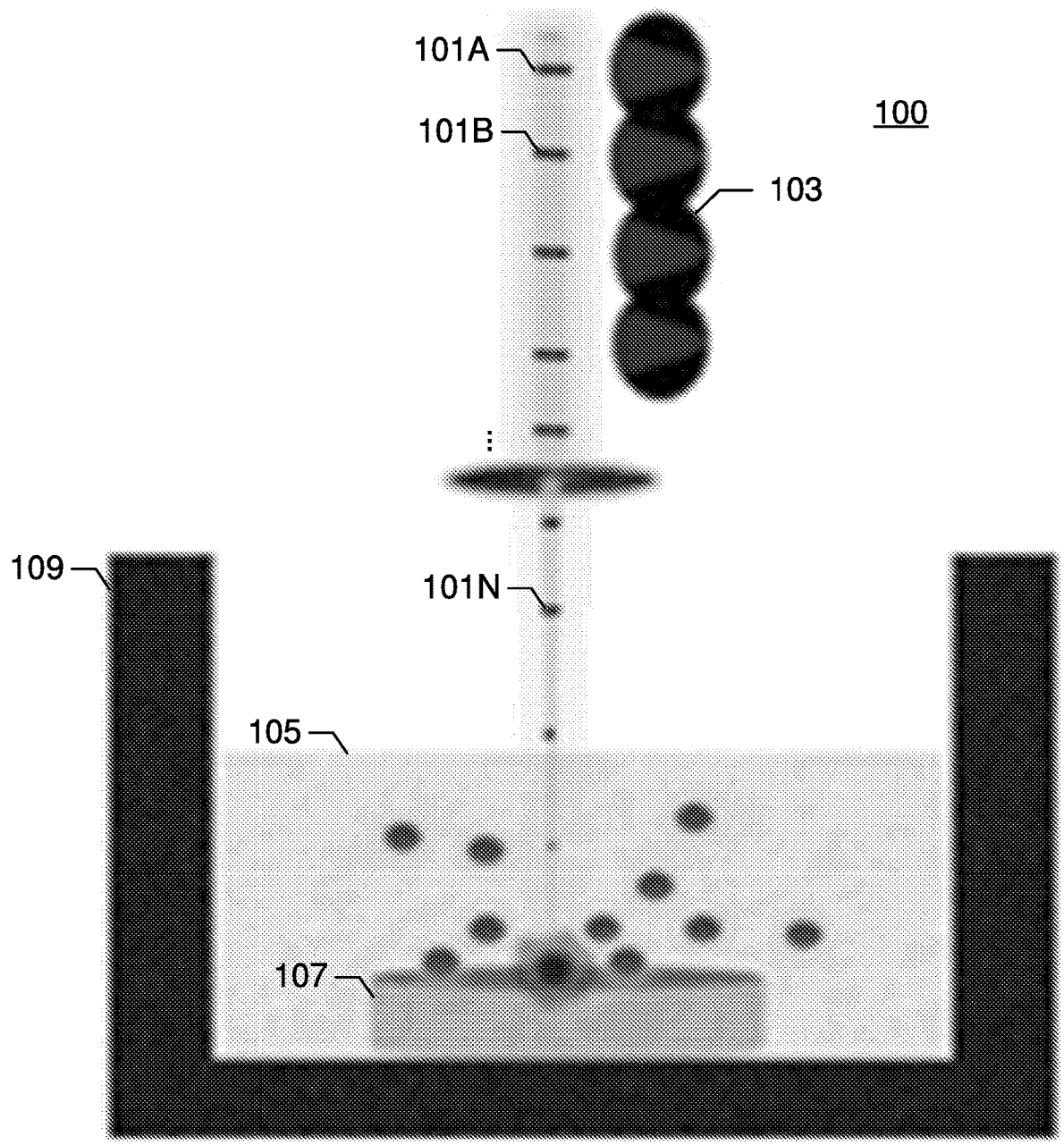
Figure 2:
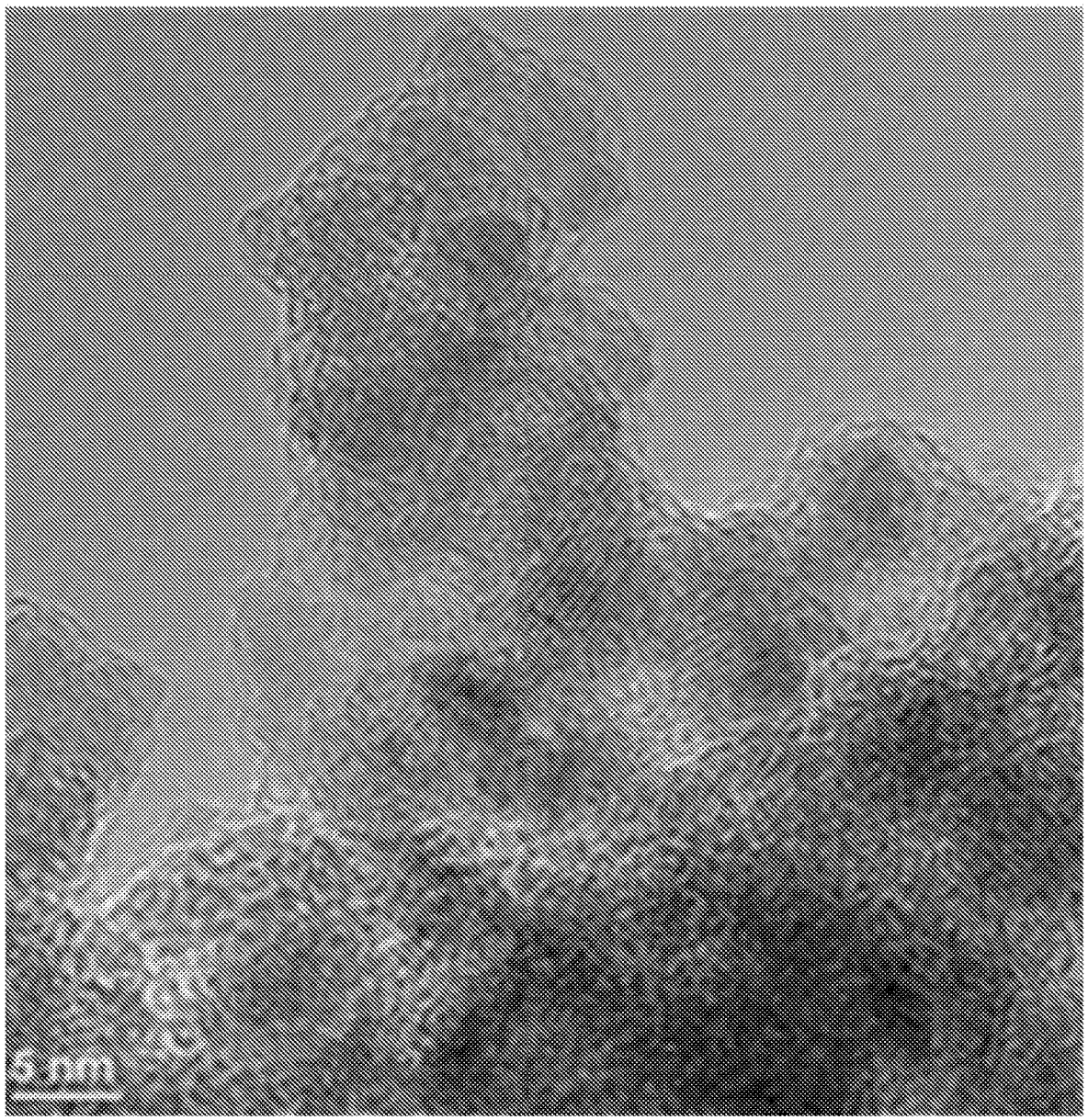
Figure 3:
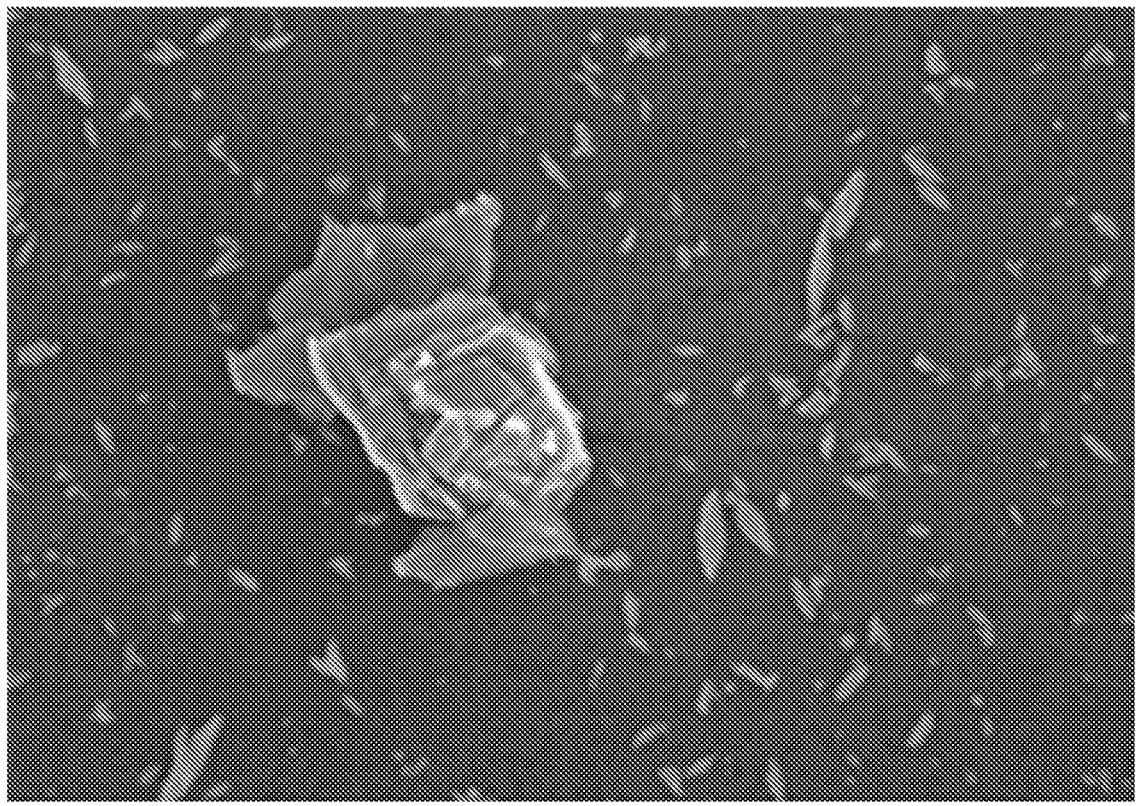
Figure 4:
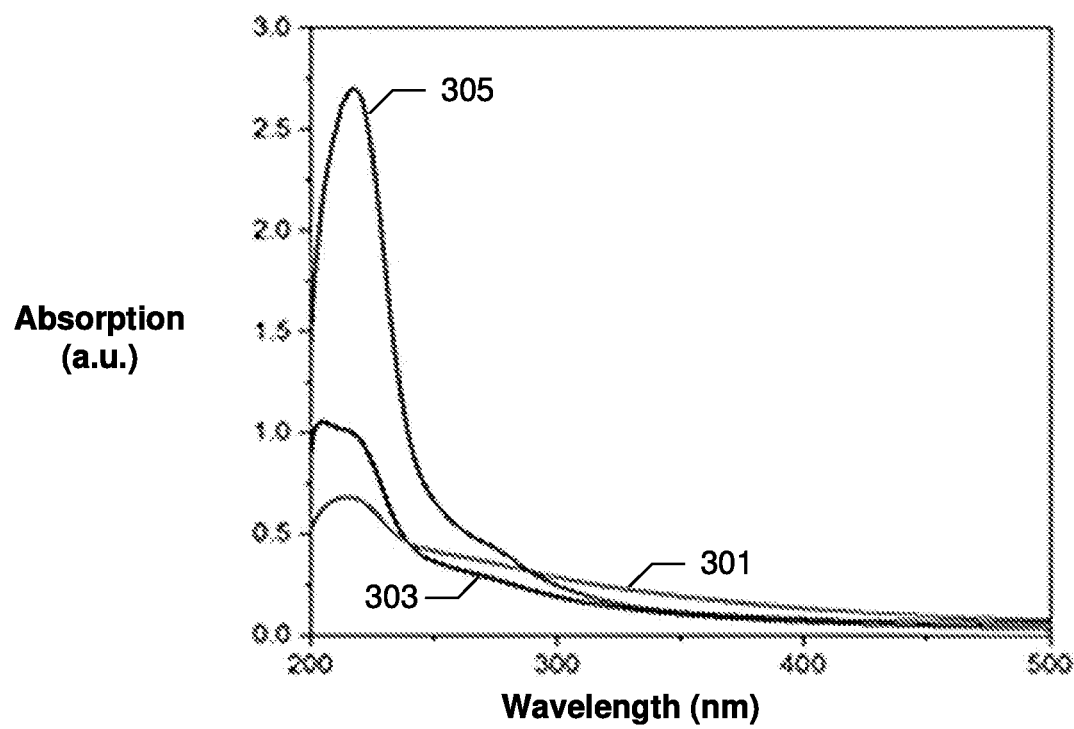
Figure 5:
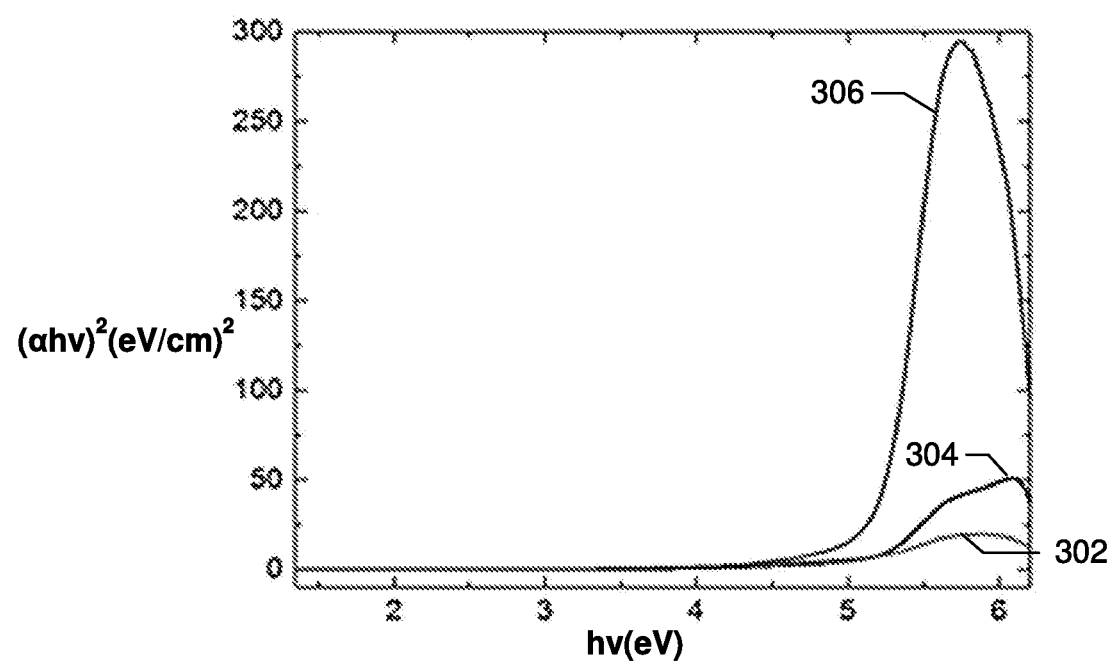
Figure 6:
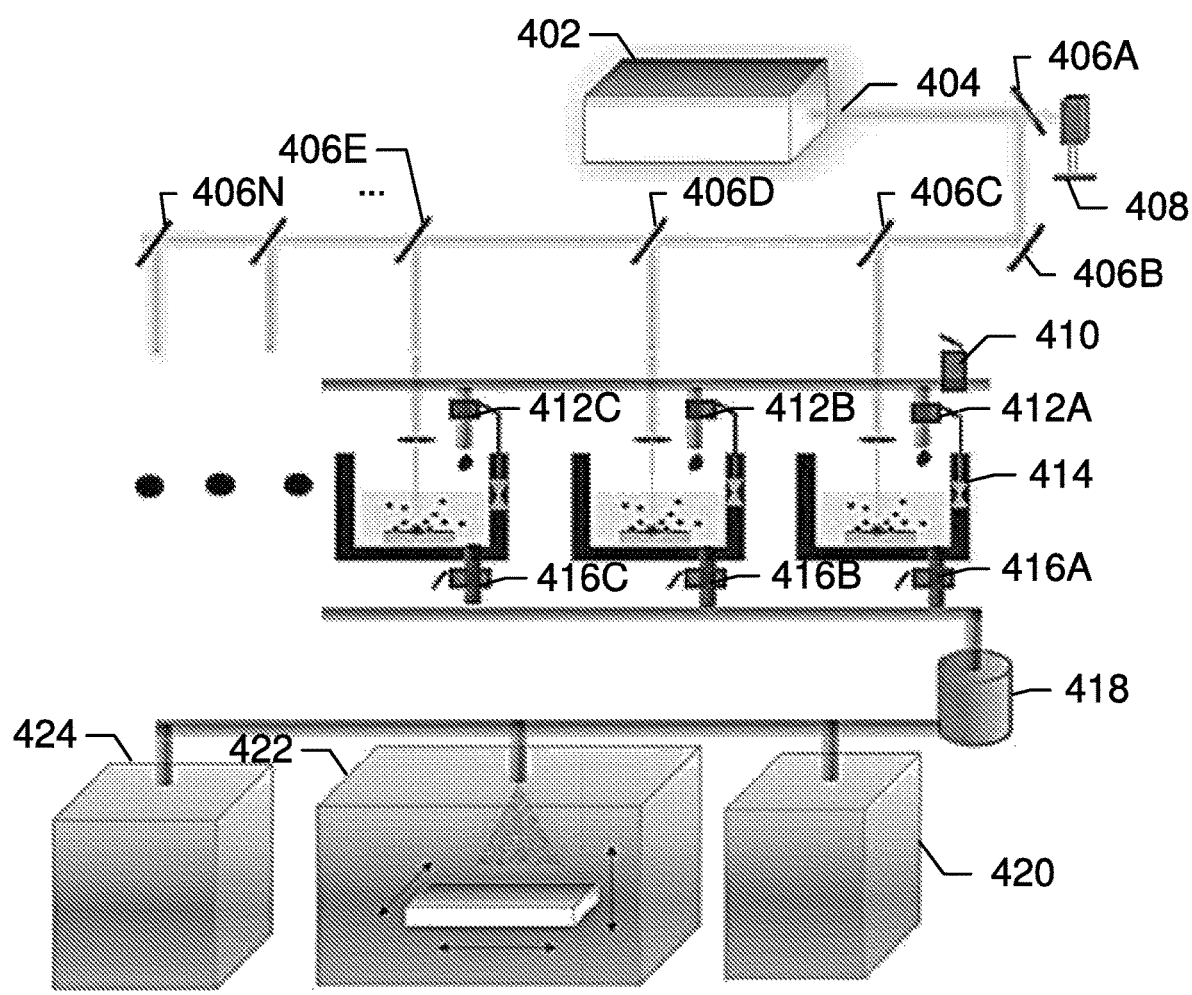
Figure 7:
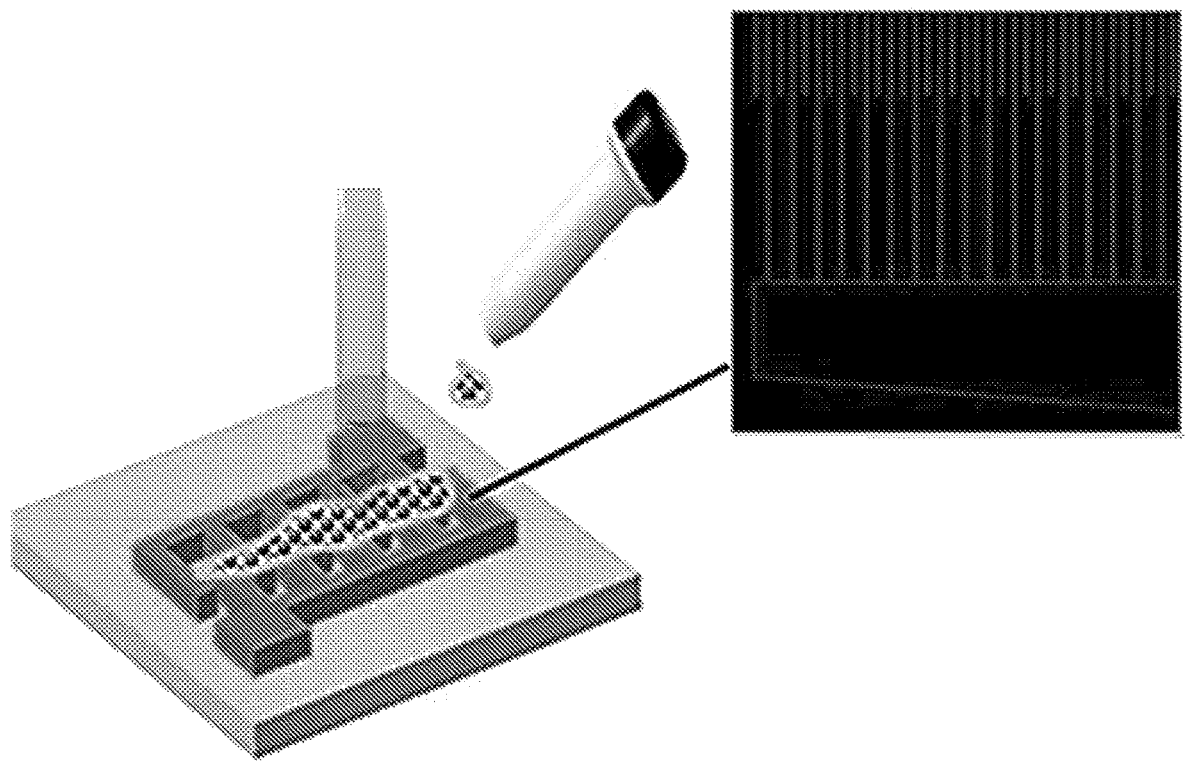
Figure 8:
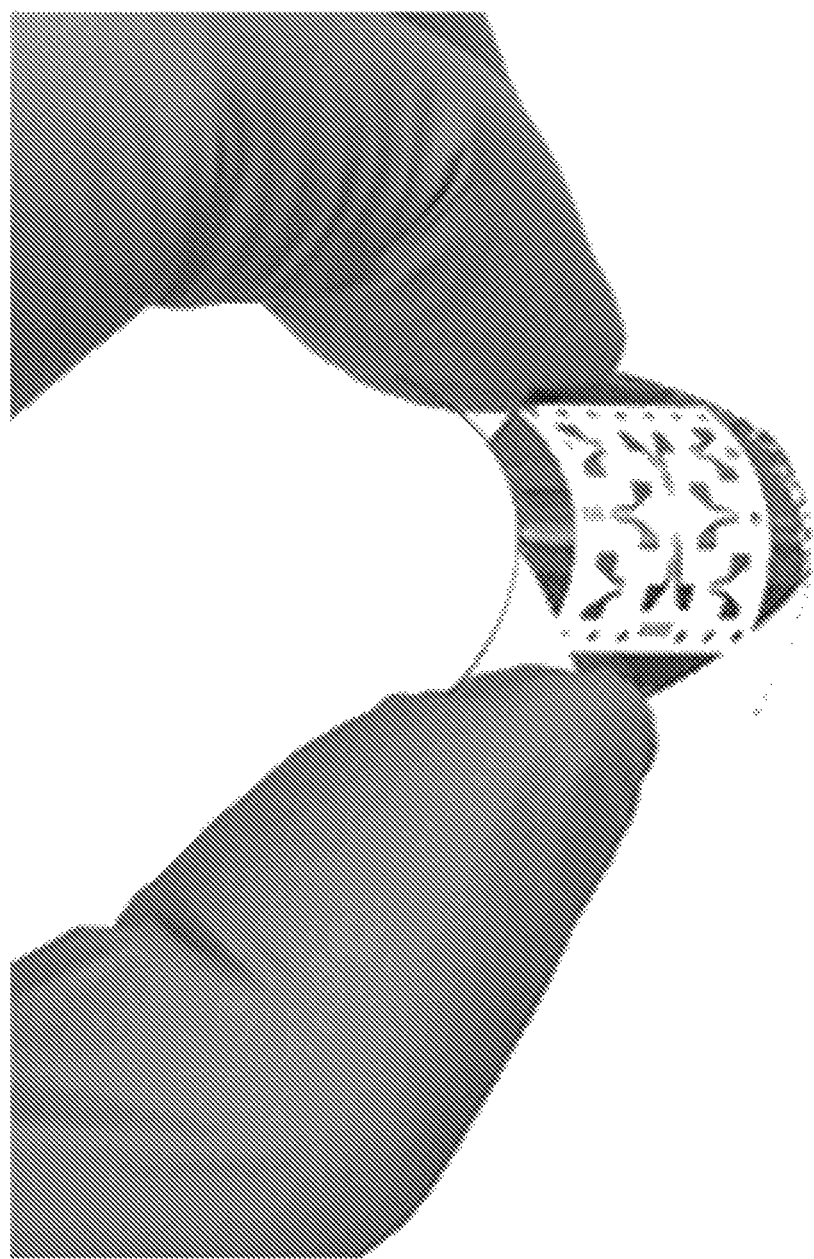
Figure 35:
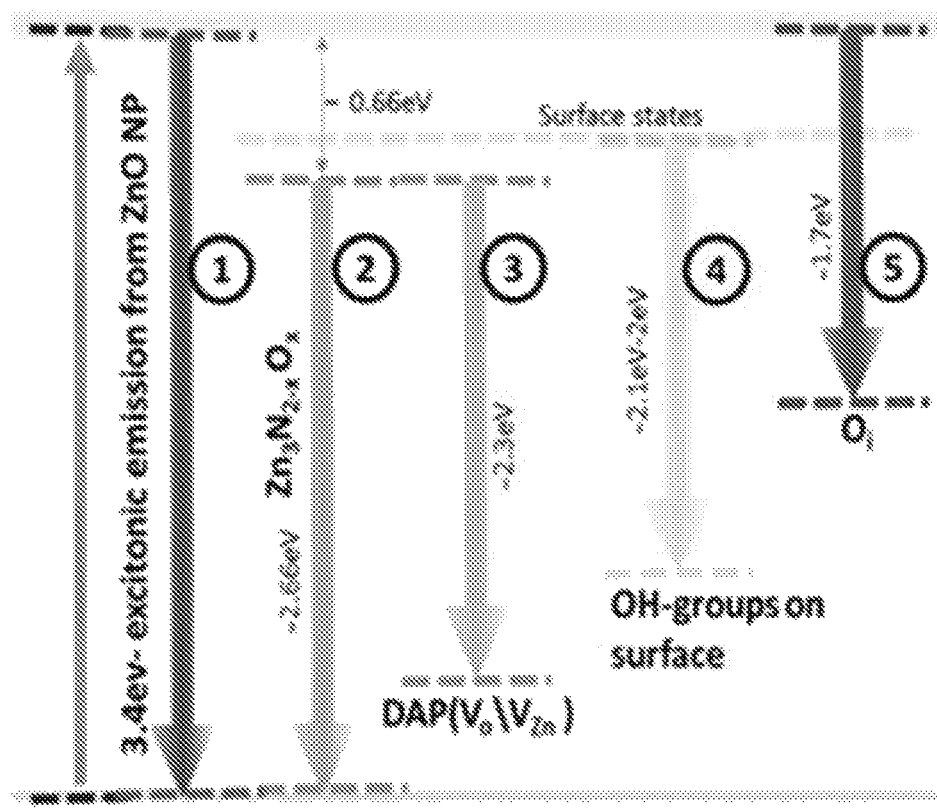
Figure 36:
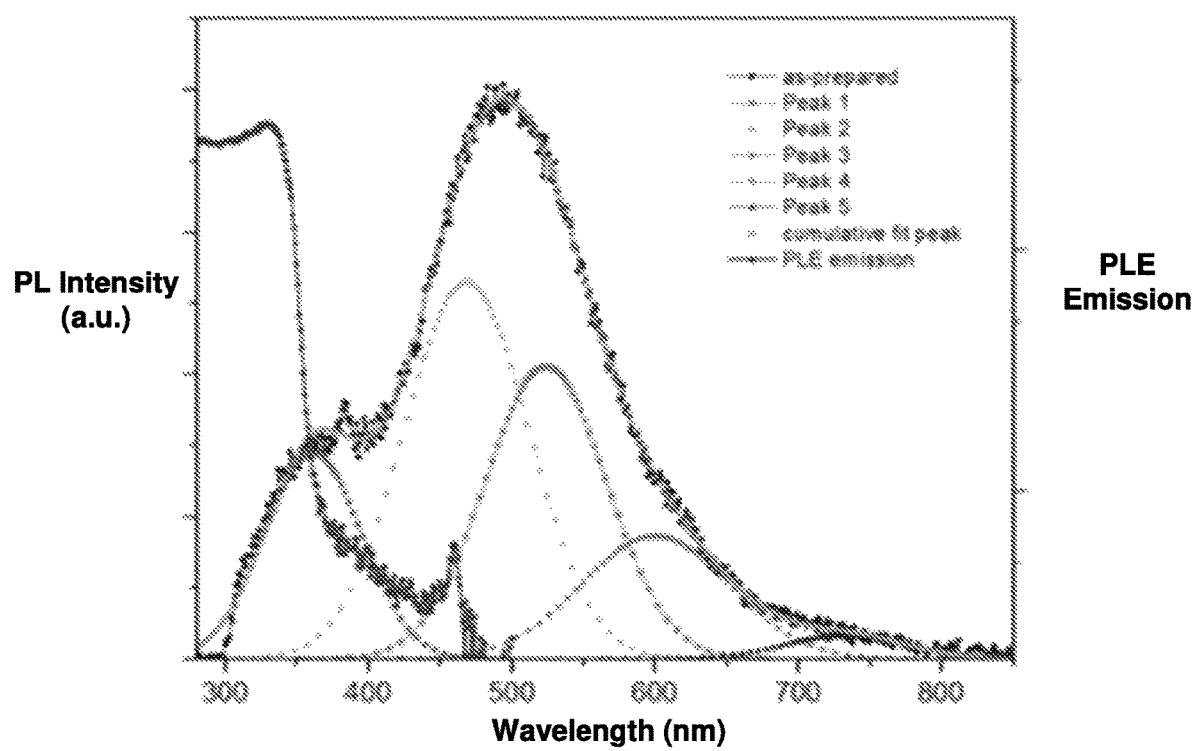
Figure 37:
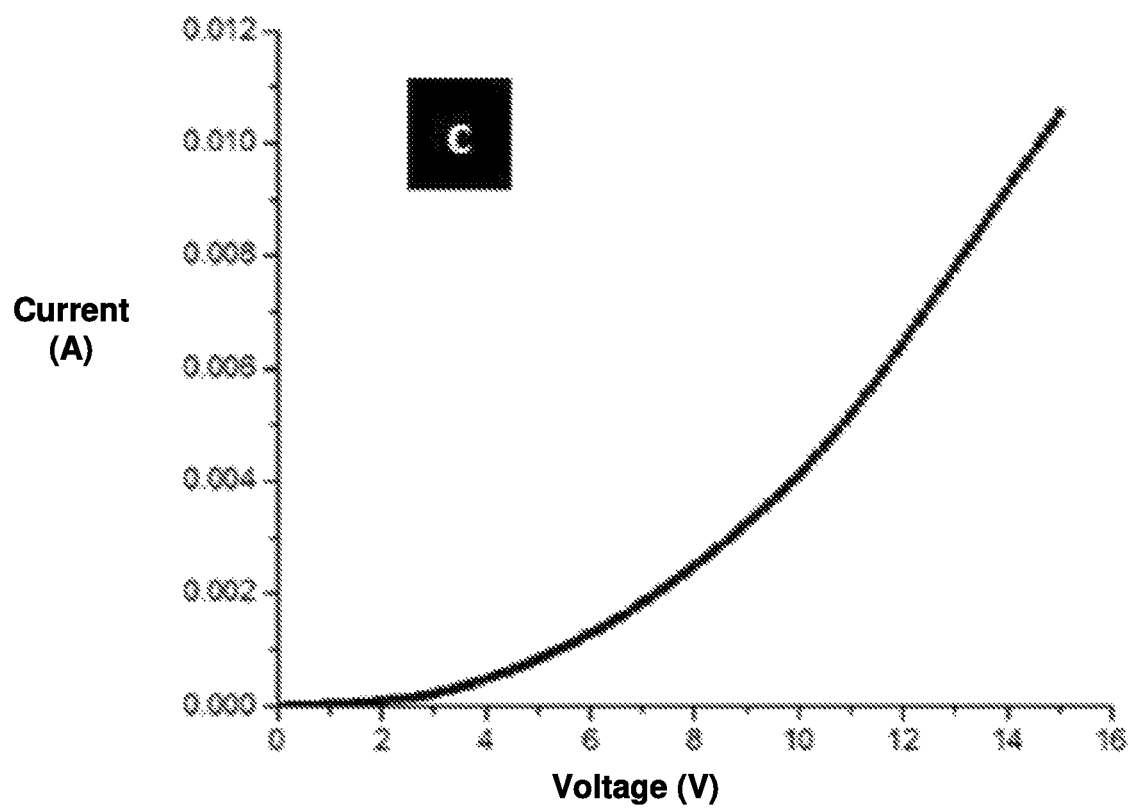
Figure 38:
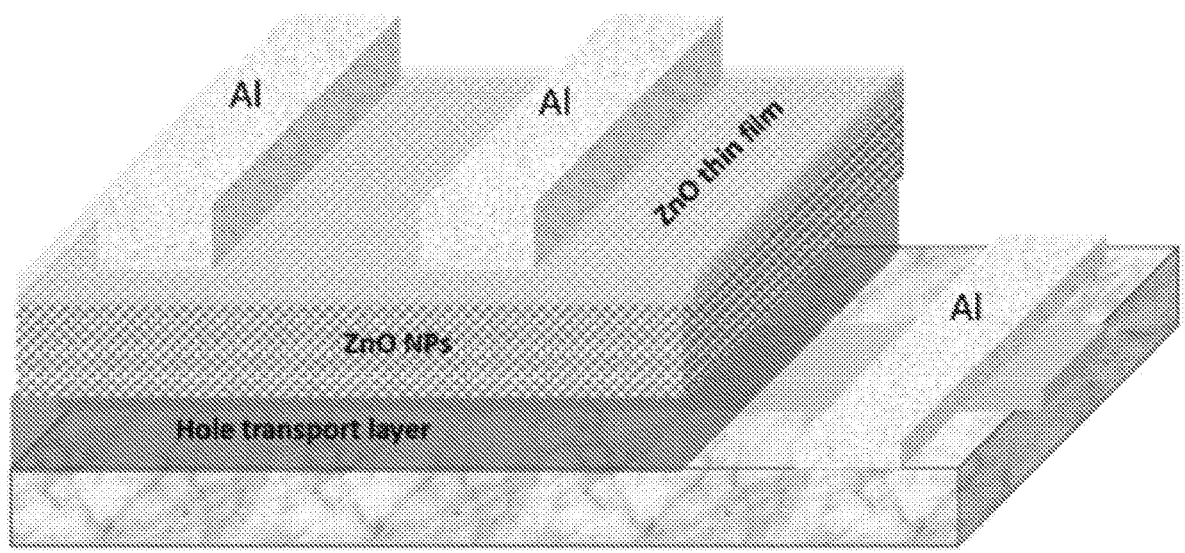

Having thus described the invention in general terms, reference will now be made to the accompanying drawings, which are not necessarily drawn to scale, and wherein:

FIG. 1 is an exemplary schematic of an exemplary femtosecond laser synthesis system, in accordance with some example embodiments described herein;

FIG. 2 is a transmission electron microscopy (TEM) image of exemplary nanoparticles synthesized in accordance with some example embodiments described herein;

FIG. 3 is a scanning electron microscope (SEM) image in accordance with some example embodiments described herein;

FIGS. 4 and 5 are diagrams illustrating absorption measurements and Tauc plot of the nanoparticles in colloidal form of nanoparticles synthesized in accordance with some example embodiments described herein;

FIG. 6 is an exemplary schematic diagram of an exemplary, scaled-up femtosecond laser synthesis system in accordance with some example embodiments described herein;

FIGS. 7 and 8 illustrate various features of optoelectronic devices fabricated in accordance with some example embodiments described herein;

FIGS. 9-34 are various diagrams illustrating characteristics of optoelectronic devices fabricated in accordance with some example embodiments described herein;

FIGS. 35-36 are diagrams illustrating characteristics of a white light-emitting diode (LED) fabricated using nanoparticles produced in accordance in accordance with some example embodiments described herein;

FIG. 37 is an exemplary diagram of characteristics of the white LED referenced in FIGS. 35 and 36; and FIG. 38 shows an example structure of the white LED referenced in FIGS. 35, 36, and 37.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. As used herein, terms such as "illustrative" and "exemplary" are used to be examples with no indication of quality level. Like numbers refer to like elements throughout.

Overview

In general, embodiments of the present invention provide simple and cost effective methods for fabricating thermally, optically, and electrically stable nanoparticles (NPs), such as quantum dots (QDs).

Laser ablation synthesis in solution (LASiS) is one of the simplest, fastest and most versatile synthesis methods. It is very cost effective, as the synthesis can be performed in atmospheric conditions without the need of environmental control. Unlike in wet synthesis, no post-synthesis chemical processing is required.

In addition, laser ablation using an ultra-short pulse in the femtosecond (fs) range is of particular relevance, as the pulse duration is shorter than the time scale of electron coupling (in ps range). Therefore, any secondary effects of post-ablation can be avoided. As a general matter, a femtosecond laser pulse does not affect a target material's absorption properties. Moreover, a femtosecond laser pulse does not interact with the ejected spices or expanding plasma plume. Instead, femtosecond laser pulses mainly interact with the sample surface, resulting in highly efficient material ablation. Compared to continuous wave (CW) or nanosecond laser ablation, femtosecond laser ablation causes low thermal damage. Therefore, if carried out close to the ablation threshold, femtosecond laser ablation can be considered "melt-free" ablation.

Because the above mention advantages using laser ablation, a wide range of nanomaterials (NMs) or nanostructures have been fabricated by laser ablation, and microsecond and nanosecond laser ablation techniques have been used for nanomaterial synthesis. However, many existing fabrication technologies must be carried out in a vacuum or in a specific gaseous environment. In addition, others have failed to utilize femtosecond laser ablation for generation of optoelectronic applications, such as emitting devices and photodetectors.

Example embodiments described herein provide various advantages over existing techniques. In some embodiments, highly thermally, optically and electrically stable nanoparticles may be synthesized by femtosecond laser ablation (FLA), and thereafter can be used as an active region for cost-effective high-performance optoelectronic devices, such as light emitting devices and photodetectors for ultraviolet (UV), visible and infrared (IR) regions, as well as white light optoelectronics. Such devices can be fabricated using different materials, such as wide bandgap semiconductors (for which high energy is required for transformation to the QDs form) including ZnO, GaN, $Mn_2O_3$, and $Ga_2O_3$ (for ultraviolet white light optoelectronic applications), and narrow bandgap semiconductors such as $MoS_2$, InN, and other semiconductors materials (for visible and infrared optoelectronics).

Some example embodiments described herein comprise a scaled-up system and corresponding methodology used to implement the femtosecond laser ablation techniques for industrial-scale production for optoelectronic applications. In some embodiments, methods for fabricating devices based on these QDs do not involve any vacuum setup or require control of environmental conditions, such as temperature, gas environment, or the like. Promising results can be obtained in deep ultraviolet (DUV) photodetectors, UV and white emitting devices, and solar applications, based on different metal oxide and semiconductor/semimetal materials such as on manganese oxide ($Mn_2O_3$), zinc oxide (ZnO) and molybdenum disulfide ($MoS_2$) as examples. Using methods in accordance with various embodiments described herein, optoelectronic devices can be fabricated on any substrate type, including flexible substrates.

Further, high-performance DUV photodetectors with detection wavelengths shorter than 300 nm are in high demand because of their many applications in diverse fields. Traditional semiconductor and thin film-based DUV photodetectors remain very costly due to their complex fabrication process. Flexible DUV photodetectors, as well as the solution-processed fabrication technique, allow for large-scale low-cost fabrication in accordance with various embodiments of the present invention.

A fast-response time remains a significant parameter of a DUV photodetector for high-speed communication. As such, various embodiments of the present invention present a novel high-performance fast-response nanoparticles-based DUV photodetector fabricated on flexible substrate under ambient conditions. In some embodiments of the present invention, solution-processed ZnO QDs are synthesized by a femtosecond-laser ablation in liquid (FLAL) technique, and this unique method for synthesizing highly stable and reproducible doped-ZnO QDs from zinc nitride target provides technical advantages over existing methods. A doped-ZnO QD-based photodetector is capable of efficiently detecting wavelengths in the DUV spectral region as short as 224 nm and exhibits high photo responsivity and stability. As described hereinafter, the surfactant-free synthesis by FLAL described herein leads to commercially available high-performance low-cost DUV photodetectors in accordance with various embodiments of the present invention.

In some embodiments of the present invention, FLA synthesis of solution-processed ZnO nanoparticles and the fabrication of a high-performance flexible DUV photodetector under ambient condition without any degradation due to water and oxygen molecule species are presented. Moreover, the synthesis of the doped-oxide QDs from a nitride source material is demonstrated below. The synthesis and the fabrication processes are highly reproducible, resulting in high-quality stable QDs. This method of synthesis can work with other materials intended for a wide range of optoelectronic and electronic applications. In some embodiments of the present invention, the highest responsivity for DUV photodetectors fabricated by solution-processed method is also presented. The flexible substrate device exhibits immunity to stress, with extremely stable and reproducible responses in the bending tests. Overall, the present invention provides for the possibility of commercially producing highly stable flexible devices and sensors with high responsivity and ultrafast response times, which can be fabricated using simple and cost-effective techniques that can be industrially upscaled.

As described herein, "quantum dots" or "QDs" are used in connection with various embodiments of the present invention. It is noted that, in various embodiments of the present invention, other applicable nanoparticles may be used. Thus, the scope of various embodiments of the present invention is not limited to using quantum dots.

Exemplary Processes for Femtosecond Laser Ablation Synthesis

As described above, the present invention relates generally to laser ablation synthesis in solution using femtosecond laser pulse. Generally, laser ablation synthesis in solution is a method for obtaining colloidal solutions of nanoparticles by the condensation of a plasma plume formed by the laser ablation of a bulk material plate, such as metal target, metal-oxide target, semiconductor target, dipped in a solution. A femtosecond laser beam is a laser which emits optical ultra-fast pulses with a duration below one picosecond, i.e., in the domain of femtoseconds (1 $fs=10^{-15}$ s).

Laser ablation synthesis in solution using femtosecond laser beams in accordance with various embodiments of the present invention provides a cost-effective, versatile technological approach to producing nanoparticles, details of which are described herein.

Individual Femtosecond Laser Ablation Synthesis

FIG. 1 is an exemplary schematic of femtosecond laser synthesis system 100 in accordance with embodiments of the present invention. The system emits femtosecond laser beam pulses 101A-101N that are directed onto a target 107 submerged in a solvent 105 that is contained within a vessel 109.

The femtosecond laser beam may be generated using a variety of techniques. In some embodiments, a Ti:sapphire laser (such as a Coherent Mira 900 laser) is employed for femtosecond laser ablation synthesis, using ~150 fs pulse width at 800 nm, and operating at a 76 MHz pulse repetition rate. FIG. 1 also illustrates the effects 103 of the femtosecond laser beam.

Interaction of the femtosecond laser beam with a target 107 spurs nanoparticle synthesis. The target 107 can be chosen from organic or inorganic material. The target 107 may also be chosen from a variety of metal, semiconductor, or metal-oxide targets. For example, it can be ZnO, $Zn_3N_2$, GaN, C, Si, CuO, $Mn_2O_3$, and $MoS_2$.

A nanoparticle is a nanoscale particle of semiconducting material that can be embedded in cells or organisms for various experimental purposes, such as labeling proteins, emitting light, etc.

The solvent 105 that the target 107 is submerged within can been chosen based on the characteristics of the target material 107 (for instance, water may not be an ideal solvent for materials that oxidize easily). A vessel 109, such as a glass vessel, may be used to contain the target 107 and the solvent 105.

Referring now to FIGS. 2 and 3 transmission electron microscopy (TEM) images are illustrated of exemplary nanoparticles synthesized by femtosecond laser ablation in accordance with embodiments of the present invention.

FIG. 2 is a transmission electron microscopy image of manganese oxide ($Mn_2O_3$) nanoparticles. FIG. 3 is a scanning electron microscope (SEM) image of the $MoS_2$ nanoparticles. As illustrated in FIGS. 2 and 3, sizes of the nanoparticles may fall within the broad range of 2 to 300 nm, and the size of nanoparticle generated using this method is a function of the power of the laser interacting with the target. Accordingly, the laser power can be tuned to produce nanoparticles matching desired sizes. And in this regard, the size of a nanoparticle determines at least some of its physical properties, so the ability to tune the power of the laser provides a significant tool for the generation of nanoparticles having desirable properties. Further, as shown in the images, the nanoparticles synthesized in accordance with the present invention are crystalline (i.e., no polycrystalline or amorphous phases are observed), indicating that these nanoparticles can be effective active materials for optoelectronic devices. The phase of the synthesized materials is determined by X-ray photoelectron spectroscopy (XPS).

Referring now to FIGS. 4 and 5, diagrams are provided that illustrate various characteristics of nanoparticles, including the absorption properties of the nanoparticles, synthesized in accordance with some example embodiments of the present invention.

FIG. 4 displays the absorption spectra of $Mn_2O_3$ nanoparticles synthesized at three different laser powers, resulting in different quantum with different sizes. Specifically, curve 301 illustrates the synthesis of $Mn_2O_3$ at 1.85 w, curve 303 illustrates the synthesis of $Mn_2O_3$ at 1.65 w, and curve 305 illustrates the synthesis of $Mn_2O_3$ at 1.18 w. As shown in FIG. 4, the absorption rate of $Mn_2O_3$ synthesized at 1.85 w peaked between 200 nm and 250 nm wavelengths, having an absorption rate higher than $Mn_2O_3$ synthesized at 1.65 w or 1.18 w.

FIG. 5 displays a Tauc plot of $Mn_2O_3$ nanoparticles synthesized at three different laser powers, which illustrates the differences of optical bandgaps as part of optical properties of nanoparticles. The bandgap of the nanoparticles can be estimated from Tauc plot. Specifically, curve 302 illustrates the synthesis of $Mn_2O_3$ at 1.85 w, curve 304 illustrates the synthesis of $Mn_2O_3$ at 1.65 w, and curve 306 illustrates the synthesis of $Mn_2O_3$ at 1.18 w. Here, $Mn_2O_3$ synthesized at 1.85 w has an energy gap of 4.93 eV. $Mn_2O_3$ synthesized at 1.65 w has an energy gap of 5.16 eV. $Mn_2O_3$ synthesized at 1.18 w has an energy gap of 5.18 eV.

Optical characterizations of targets must been carried out to identify the optical properties of the materials shown in FIGS. 4 and 5. However, based on optical characterization, different laser parameters (power and wavelength in particular) can be determined that optimize nanomaterial dimensions and, in turn, optical properties. Therefore, it is important to identify optimal parameters specific to each material for different applications.

Scaled Up Femtosecond Laser Ablation Synthesis

As shown in FIG. 6, some example embodiments contemplated herein extend the concept of nanoparticle generation using femtosecond laser ablation synthesis in solvent to a commercial-scale system utilizing multiple synthesis chambers. A system utilizing a scaled up scheme for mass production of nanomaterials by femtosecond laser ablation synthesis may then be followed by a deposition process to apply the generated nanomaterials on the fabricated devices, (as will be described in greater detail herein).

In general, various embodiments of the present invention provide flexible system designs that can be adapted to various manufacturing needs for creating nanoparticles (such as quantum dots) having any of a variety of properties. The system in FIG. 6 includes a femtosecond laser beam generator 402 capable of generating a femtosecond laser beam 404. In some embodiments, the femtosecond laser beam generator 402 may be a Ti:sapphire laser device able to generate a laser with a pulse duration of 150 femtoseconds, a pulse width of 800 nanometers, and a pulse repetition rate of 76 MHz.

The power of the femtosecond laser beam 404 is monitored by the power meter 408, and may be adjusted if it is not consistent. As discussed above, the power of the laser beam may change the dimensions and properties of the nanoparticle created by ablation of the semiconductor targets. Therefore, monitoring the power of femtosecond laser beam using power meter 408 enables the system to ensure generation of nanoparticles having consistent optical properties.

The femtosecond laser beam may further be split by the beam splitters 406A-406N split to ablate multiple targets simultaneously. In this regard, the splitting of the femtosecond laser beam may require adjustment of the total optical power of laser, as the power of each derivative laser beam will be a fraction of the power of the original femtosecond laser beam. For instance, the femtosecond laser beam 404 may have a total optical power based on a collectively required power for the plurality of semiconductor targets to be ablated, and the beam splitters split the femtosecond laser beam 404 into a plurality of derivative femtosecond laser beams, each having an individual optical power comprising a fraction of the total optical power. Each of the beam splitters has a corresponding splitting ratio determining the fraction of the laser directed to a corresponding target, and this splitting ratio may be adjusted in some embodiments based on the individually required power for the corresponding target.

The targets are preferably submerged in solvent to ensure that generated nanoparticles are captured for later use. In some embodiments, the targets may be any of ZnO, $Zn_3N_2$, GaN, C, Si, CuO, $Mn_2O_3$, and $MoS_2$, although one having ordinary skill in the art will appreciate that other materials may be utilized by the system based on the manufacturing considerations and optical properties relevant to a given industrial application.

As further shown in FIG. 6, the solvent may be provided through a solvent supply valve 410, and distributed to each synthesis chamber by a corresponding solvent release valve 412A-412C. The height of the solvent, as measured from the target surface, is critical for ensuring that the target is fully submerged and that nanoparticles created by the ablation process are captured by the solvent. The height can be monitored by a sensor 414 that can be attached to the solvent release valves 412A-412C in the solvent supply line for each chamber. The level of the solvent can be further monitored by sensors, such as sensor 414, and the height of the solvent can be further adjusted based on the sensed level of the solvent.

After ablation, the nanoparticle solution is drained from the synthesis chambers through collection end valves 416A-416C, allowing the solution to be collected in collection chamber 418. One or more additional post-collection chambers, such as evaporation chamber 420, spraying chamber 422, and coating chamber 424, may be used to further process the nanoparticle solution and utilize the generated nanoparticles.

For example, the nanoparticle solution can be directed for deposition, or it can be evaporated in the evaporation chamber 420 for a predetermined period of time to generate a nanoparticle powder. In some embodiments of the present invention, further processing may be conducted to fabricate optoelectronic devices using nanoparticles. Such processing may be conducted in the spraying chamber 422, which spray-coats the nanoparticles onto a substrate, or in the coating chamber 424, which dip-coats and/or spin-coats the nanoparticles onto substrates. Such processes are described below for exemplary purposes, although it will be understood that a wide range of uses of the generated nanoparticles are contemplated herein.

Systems structured in accordance with embodiments of the present invention provides many advantages. For example, the system is readily reproducible, and the consistency of the nanoparticles generated using embodiments of this femtosecond laser ablation synthesis is very high. Moreover, the target material can be used for many synthesis cycles. Therefore, once the power level is optimized, it is possible to repeatedly perform the synthesis process. Moreover, this process does not involve any expensive equipment other than the femtosecond laser itself, along with any proprietary tools for nanoparticle deposition, so example embodiments contemplated can utilize an auto-controlled design.

Exemplary Processes for Fabricating Optoelectronic Devices

In some embodiments, optoelectronic devices are fabricated based on $Mn_2O_3$, ZnO, $MnS_2$ and/or GaN nanoparticles to provide deep ultraviolet and ultraviolet photodetectors, as well as ultraviolet and white light emitting devices. FIGS. 7 and 8 show examples of fabricated electrodes that could be used to make such devices.

In some embodiments, the process for fabricating electrodes uses the following steps:

(1) preparing the substrate, which may include cleaning the substrate in the sequence of acetone, isopropyl alcohol, and deionized water for ten minutes, blowing nitrogen onto the substrate, and drying on a hot plate at 100° C. to completely remove water molecules;

(2) photoresist spincoating, which may include spincoating with a light-sensitive material, such as photoresist 5214 (positive tone). The process may be performed at 3000 rpm for one minute, and baked at 100° C. for one minute. The thickness after the spincoating will be measured to be approximately 1.6 um;

(3) exposure: exposing the substrate under ultraviolet with 100 $mJ/cm^2$;

(4) developing the substrate in DEF 726, digging it for one minute, washing it in deionized water;

(5) deposition of metal (electrode) by an Electron Beam Evaporator, which may provide 50 nm thickness of deposited Ti below $10^{-6}$ Torr; and (6) lifting off in acetone only to leave the metal electrode, with the patterned PR 5214 removed.

The above mentioned process may be followed by simple deionized water washing.

After fabricating the electrodes, addition processes are used to fabricate optoelectronic devices using the electrodes.

Exemplary Fabricated Optoelectronic Devices

In various embodiments of the present invention, optoelectronic device structures can be fabricated on any substrate. For instance, FIG. 7 shows a schematic of the device showing the interdigitated electrode with drop-casted and dried or spray coated nanoparticles. FIG. 8 shows the design of a fabricated electrode.

Ultraviolet Photodetector and Deep Ultraviolet Photodetector

Opto-electronic technologies require cost-effective, energy efficient and transparent devices fabricated on flexible substrates. Deep-ultraviolet (DUV) photodetector and sensor technologies operating in the UV-C spectral region (<280 nm) have drawn considerable attention of researchers and practitioners due to their potential applications in diverse fields, such as high-temperature flame detection, missile launch detection, environmental monitoring, binary switching in imaging techniques, remote control, chemical analysis, ozone layer monitoring, secure space-to-space communications, and biological threat detection because of their ability to detect biotoxins.

In most of these applications, operation speed of the photodetector is critical. Conventional DUV photodetectors operating in the UV-C range are based on high-quality, wide-bandgap thin-film materials such as ZnO, GaN, AlGaN, SiC, and diamonds. However, sophisticated fabrication and processing methods are required to produce devices that utilize these high-quality thin-film materials, leading to a prohibitively expensive end product. Moreover, most thin film-based photodetectors suffer from lattice mismatch between the substrates and the thin films, which hinders performance and long-term stability. In addition, commercially available silicon-based photodetectors require high-temperature processing and suffer from surface recombination due to strong light absorption in the DUV range. The high sensitivity of the surfaces of nanostructures, such as ZnO nanowires, $Ga_2O_3$ nanowires, $Ga_2O_3$ nanosheets and ZnS nanobelts, makes them potential candidates for UV/DUV photodetectors. Furthermore, device structures involving such nanostructures are plagued by high-cost fabrication methods that invariably complicate the logistics of large-scale manufacture. As such, producing a highly responsive and reproducible DUV (UV-C) photodetector by using cost-effective solution-processed fabrication methods remains a challenge in existing systems.

For example, there have been recent reports of solution-processed graphene quantum dots (GQDs) deposited on quartz substrate for a DUV photodetector application. However, the device performance of such GQDs, including responsivity, is not sufficient for DUV prohodetector usage. Their device degradation is ascribed to the defects created in GQDs related to water and oxygen molecule species that trap the carriers, leading to low device performance even in controlled environments (e.g., vacuum). Therefore, the sustainability of the material and stable photo-detection properties under ambient conditions remain challenging in these existing systems, hindering practical application of this design.

As noted above, a key parameter of a photodetector device is its response time, which determines its capability to detect rapidly varying optical signals. Long carrier lifetime decreases the photodetector response time. A slow time response of a photodetector is attributed to high density of trapped electronic states, which is normally induced by defects. This slow response hinders the practical application of the devices. Therefore, it is very important to maintain the high responsivity and the fast response of photodetector devices.

The growing demand for flexible electronics and optoelectronics requires materials that can provide a range of electrical and optical functionalities, and are immune to stress and strain. A wide range of flexible optoelectronic devices, such as light emitting diodes, photovoltaic devices, and photodetectors, have been produced. Nevertheless, challenges remain in the development of flexible photodetectors, due to the stiffness of the bulk semiconductor or the metal oxides. Therefore, adapting nanomaterials for use in flexible devices has become increasingly viable to overcome the stiffness problem and to progress towards the use of plastic or deformable substrates. However, no existing approach of this nature has been exploited in the generation of flexible DUV photodetectors to date.

Zinc oxide (ZnO) remains a promising material in the development of optoelectronic devices, including DUV photodetectors, due to its wide bandgap (3.3 eV) and high exciton binding energy (60 meV). In addition, ZnO materials possess high chemical and thermal stability and are naturally abundant and nontoxic. ZnO QDs are particularly interesting, owing to their tunable bandgap in the DUV regime. It is well known that the inherent junction barrier between ZnO QDs is highly sensitive to the concentration of photo-generated carriers. Thus, dot-dot junctions in a ZnO QD network should significantly improve conductance under DUV illumination. Moreover, due to the high surface-to-volume ratio of QDs, their detection sensitivity is relatively higher with respect to the bulk ZnO. However, DUV photodetectors based on ZnO QDs have not been implemented in existing methods.

Most exiting methods for constructing DUV photodetectors involve complex procedures and require costly equipment. Moreover, most of the chemical methods are not environmentally friendly, since they require use of organic solvent (e.g., DMF), a reducing agent, and a capping agent. In addition, byproducts of chemical and electrochemical processes must be managed safely, while post-synthesis procedures are required to collect the nanoparticles or nanostructures. Moreover, a post-annealing process for crystallization in a reducing or oxidizing atmosphere is necessary in the preparation process, which usually destroys the as-prepared nanostructures. In addition, C-doped ZnO QDs have not been previously prepared by chemical synthesis. Although several attempts have been made in the existing systems to produce C-doped ZnO nanostructures by thermal plasma and chemical techniques, none have achieved the results obtained in accordance with various embodiments of the present invention.

In some embodiments of the present invention, solution-processed QDs are used as an active layer in fabricating a novel state-of-the-art fixable DUV photodetector by a cost-effective, facile, and simple technique. High responsivity, fast response and stable switching performance of DUV photodetectors (at UV-C range) can be achieved. The performance of the device remains extremely stable over several months under ambient conditions without any degradation that is due to water and oxygen molecule species.

In some embodiments of the present invention, both rigid and flexible substrates (polyethylene terephthalate (PET)) are utilized for device fabrication. A unique synthesis method of ZnO QDs is used by FLAL, which can be applicable to other materials and can be scaled up for higher throughput material synthesis. At the same time, a spraying method, as an inexpensive fabrication technique, allows the process to be cost-effective.

In some embodiments of the present invention, C-doped ZnO QDs are formed from zinc nitride targets. Until now, such a workaround has remained unexploited in existing systems. As described hereinafter, the formation mechanism is explicated with the support of experimental results and theoretical calculations using density functional theory (DFT).

a. Nanoparticle Synthesis

In some embodiments of the present invention, FLAL synthesis under atmospheric conditions may be used. As described above, FLAL is a simple, fast, versatile and inexpensive method for producing high-quality solution-processed QDs, including C-doped ZnO QDs. Moreover, unlike in wet synthesis methods, no post-synthesis (heating, cleaning, etc.) chemical processing is required. FLAL synthesis is also faster than a sol-gel method, and a FLAL technique can produce well-crystallized pure nanoparticles (NP) without generating any byproducts.

In some embodiments of the present invention, a zinc nitride ($Zn_3N_2$) (such as that provided by AJA International Inc.) target is used as a source material for Zn. In some embodiments of the present invention, the $Zn_3N_2$ target is the best source material to produce high-quality C-doped ZnO nanoparticles because it requires far less laser power for FLAL synthesis than a pure ZnO target. The difference in the ablation laser power threshold for the targets may be attributed to the bond strength between Zn and N or O. In some embodiments of the present invention, a titanium-sapphire (coherent-Mira 900) laser with optimum operating conditions of 150 fs pulse width and 76 MHz pulse repetition rate at 800 nm wavelength may be used for FLAL synthesis. Laser ablation by using ultra-short femtosecond (fs) pulses provides distinct advantages over continuous wave (CW) or nanosecond (ns) lasers. For example, the pulse duration is shorter than the time scale of electron coupling (in the ps range). Any secondary (post-ablation) effects on the QDs can thus be avoided. In addition, the ultrafast pulses of fs lasers do not affect the material absorption properties and do not interact with ejected species and expanding plasma plumes. Therefore, the incident ultrafast pulses should mostly interact with the target surface, resulting in highly efficient material ablation. Further, thermal damage due to ablation is low relative to CW or ns laser ablation. Therefore, this method may be classified a melt-free ablation process, if carried out close to ablation threshold. Furthermore, FLAL is non-selective to the source material, which enables this process to synthesize many other materials and can be scaled up for higher throughput device fabrication.

b. Device Fabrication

In some embodiments of the present invention, interdigitated electrodes may be prepared using photolithography on silicon oxide substrate ($SiO_2$) followed by e-beam evaporation (for example, Oxford Instrument. U.K.) of titanium. For example, the devices illustrated in FIGS. 26 and 31 were prepared in this way. In some embodiments, shadow-mask technique using the e-beam evaporation may be implemented. For example, the device illustrated in FIG. 32 (using flexible PET substrate) is prepared this way. The Ti electrode thickness remained at 100 nm, and the distance between the electrodes was 20 μm.

Figure 26:
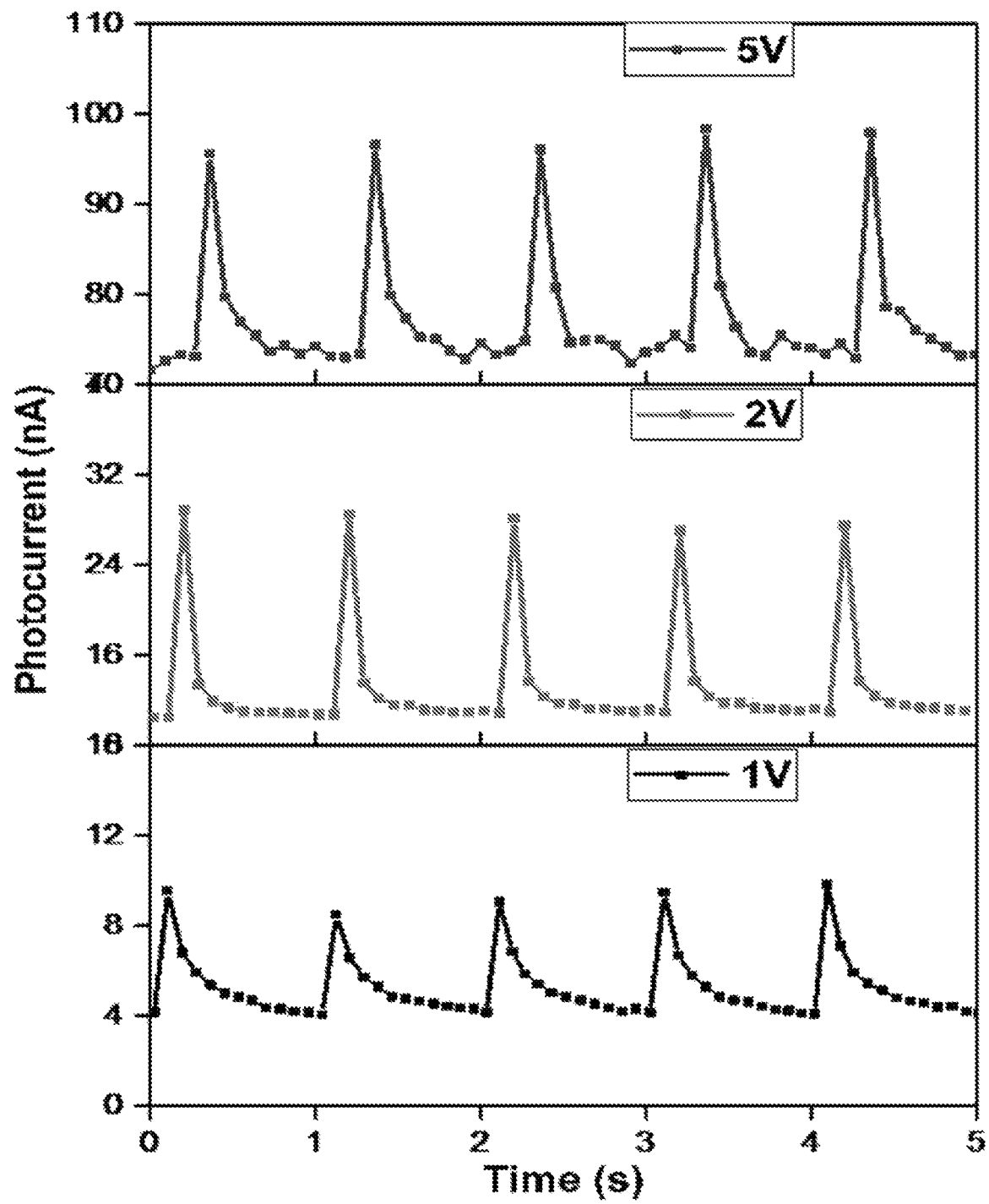
Figure 31:
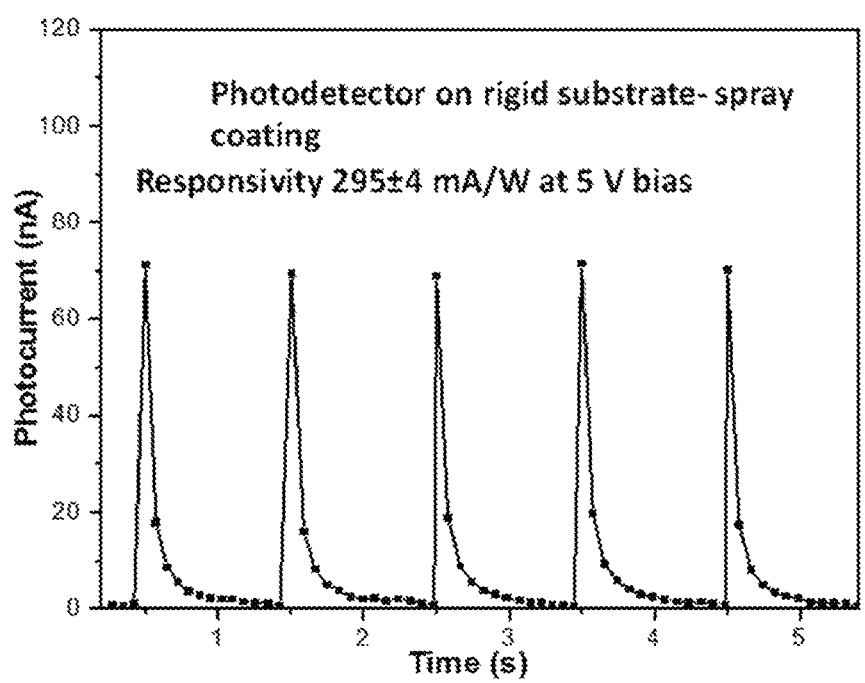
Figure 32:
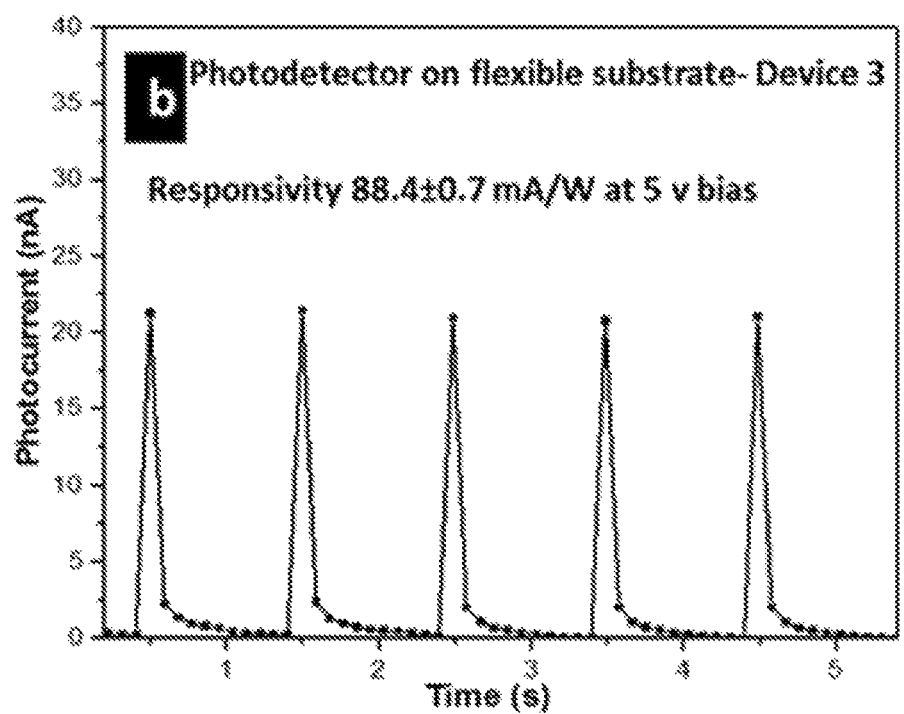

Continuing from the previous example, the device illustrated in FIG. 26 is prepared by drop casting 10 ml of colloidal QD solution over time, with the substrate temperature kept constant at 100° C. The device illustrated in FIG. 31 is prepared by spray coating 10 ml of colloidal QD solution on a heated (100° C.) substrate, whereas the (flexible) device illustrated in FIG. 32 is prepared by spray coating 10 ml of colloidal QD solution on an interdigitated titanium (Titanium) electrode (ITD) deposited on polyethylene terephthalate (PET) substrate. The PET substrate was kept on a hotplate at 50° C. The solution was sprayed on the PET substrate for a precise amount of time for 5 min using a small volume, such as 2 ml, each time.

c. DFT Calculations

As noted previously, the formation mechanism of C-doped ZnO QDs from zinc nitride targets is explicated with the support of experimental results and theoretical calculations using density functional theory (DFT). To perform the DFT calculations, a "magic" $Zn_{12}O_{12}$ cluster was simulated (shown in FIG. 19, described in details hereinafter) by employing the Vienna Ab initio simulation package, a plane wave electronic structure code (VASP). The selection of this cluster was based on reports indicating that this particular size possesses the most stable structure, and is hence named the "magic" cluster. To avoid interactions between the repeating images due to periodicity, the cluster was simulated in a cube of volume (20 Å) that ensured sufficient separation. PAW-PBE formalism was used to describe the exchange and a correlation functional in the generalized gradient approximation with Hubbard parameters U=4.0 eV and J=1.0 eV. The calculations were performed at the gamma point, and a plane-wave cutoff energy of 500 eV was used to describe the basis set. The cluster was optimized within a force tolerance of 0.01 eV/A to minimize the Hellmann-Feynman forces on each atom.

d. Photodetector Characterizations

To derive the photodetector characteristics, a HeAg pulsed (Laser 2000 U K Ltd.) laser with a 224.3 nm wavelength was used for illumination. The laser repetition rate remained at 1 Hz throughout the experiments. To measure the I-V characteristics, a probe station was attached to a Keithley 2400 SourceMeter (for example, Tektronix, China). The laser pulse width remained below 200 µs. The responsivity was calculated by dividing the photocurrent ($I_{ph}$) generation by the illuminated optical power:

$$R = \frac{I_{ph}}{P_o},$$

where $I_{ph}$ is the generated photocurrent and $P_o$ is the illuminated optical power.

e. Results

Figure 9:
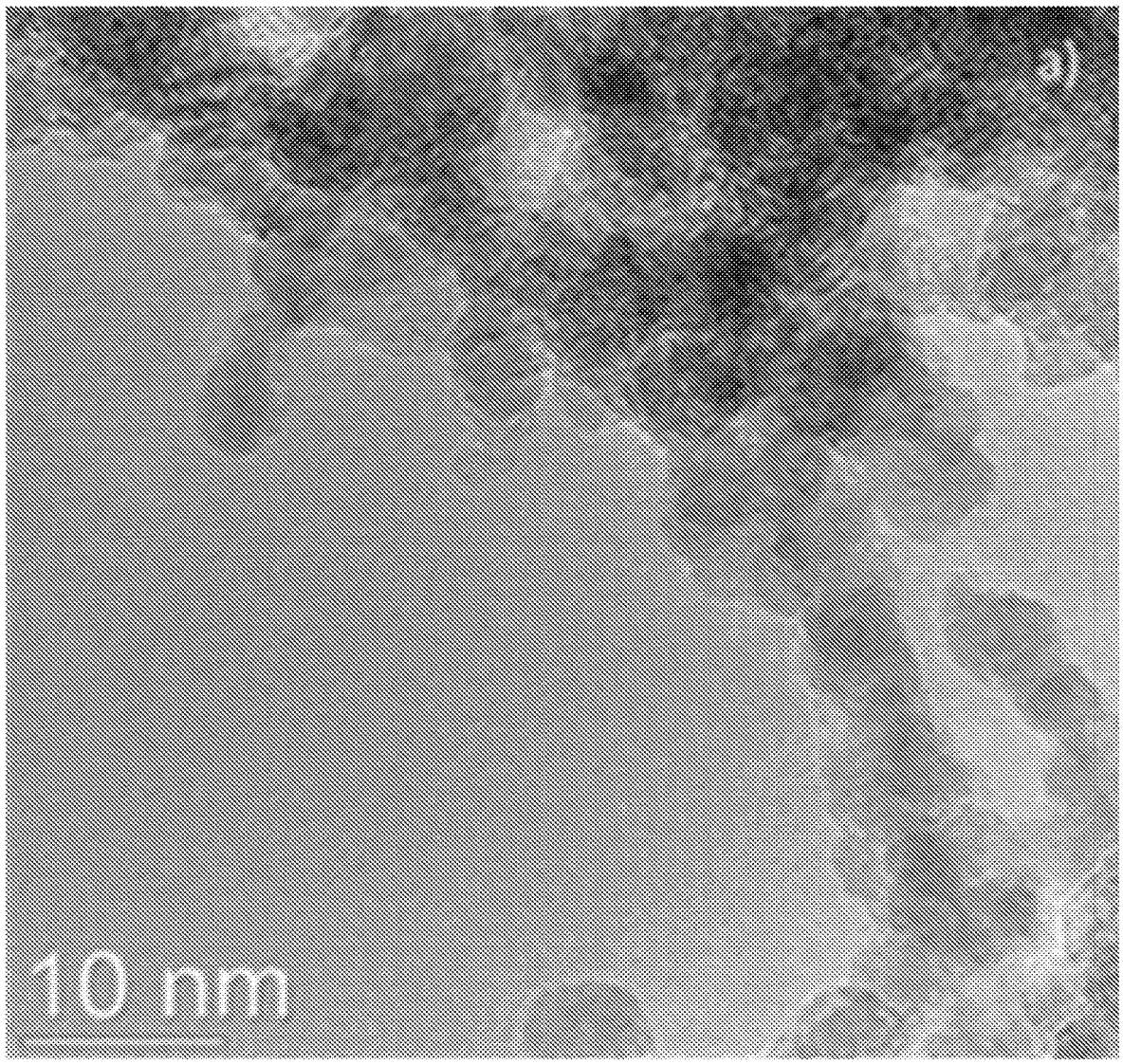
Figure 10:
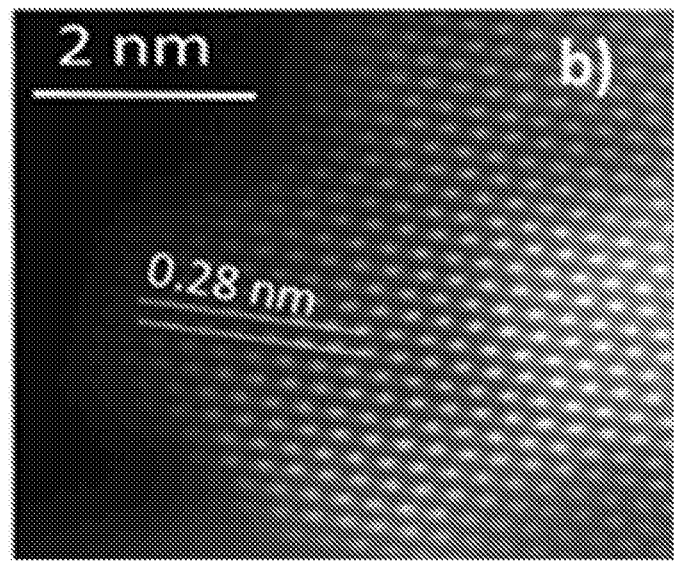
Figure 11:
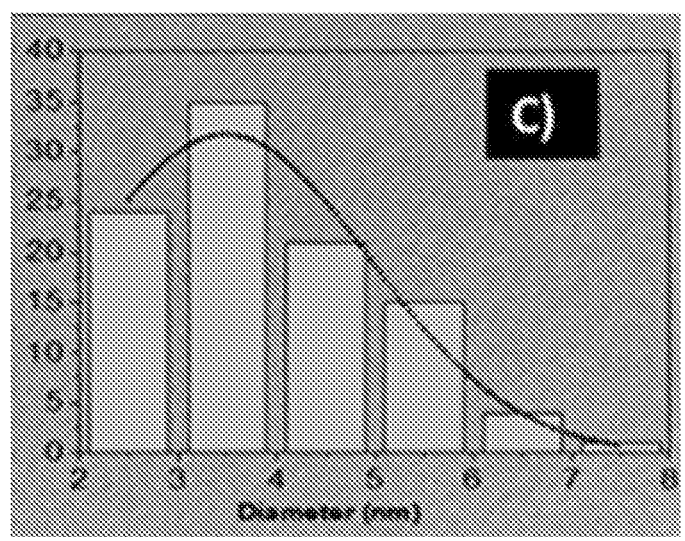
Figure 12:
Figure 13:
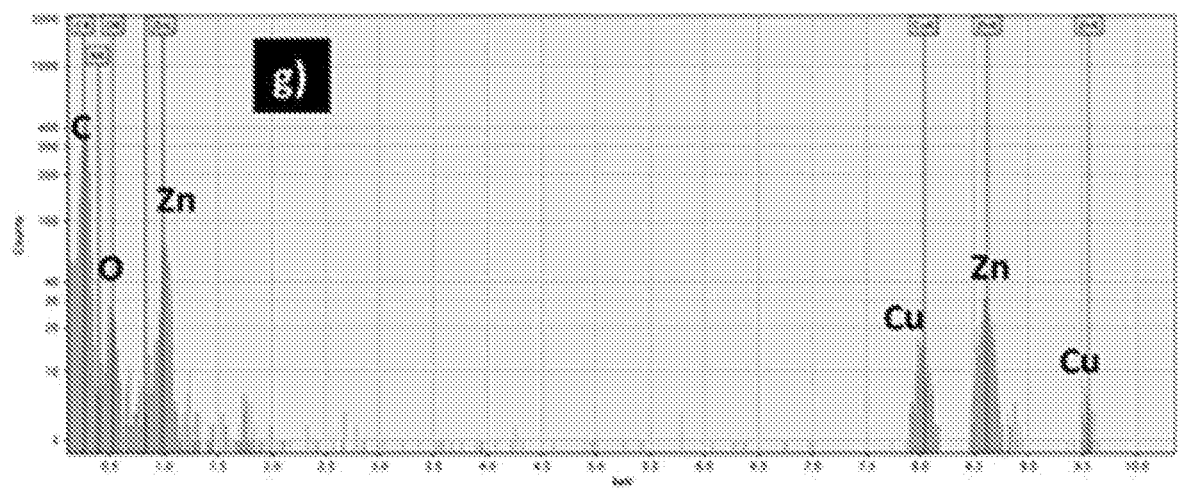

FIGS. 9-13 illustrate results obtained via a Titan 60-300 microscope (obtained from FEI Co) equipped with Cs probe corrector and imaging filter Quantum 966, operated at 200 kV in STEM mode. FIG. 9 is a TEM image of ZnO QDs. FIG. 10 is a TEM image of ZnO QDs exhibiting typical fringes of crystalline structures. FIG. 11 illustrates an average particle diameter (3.4±1.7 nm) as measured in several low-resolution images. EELS compositional maps of QDs of O, Zn, and C are illustrated in FIG. 12. FIG. 13 illustrates EDX measurements of the ZnO QDs confirming the presence of C, Zn and O.

The high-resolution transmission electron microscopy (HR-TEM) and electron energy-loss spectroscopy (EELS) mapping confirms the material composition and structural properties of FLA-synthesized QDs.

The TEM image in FIG. 9 shows the crystallinity (wurtzite structure) of QDs that were drop-casted and dried on copper (Cu) TEM grids. The d-spacing of ~0.28 nm corresponds to the (100) plane, as shown in FIG. 10. To calculate the size distribution of the ablated QDs, the diameter of ~100 QDs in a low-magnification image was measured. The size distribution shown in FIG. 11 indicates an average particle diameter of 3.4±1.7 nm. FIG. 12 shows the EELS maps of QD elemental compositions, indicating that the ZnO QDs are composed of Zn and O, with heavy presence of C dopants. The heavy C doping is confirmed by energy-dispersive x-ray (EDX) spectroscopy, as shown in FIG. 13. C atoms can occupy both Zn-vacancy ($V_{Zn}$) and O-vacancy ($V_O$) sites and C dopants were found to prefer substitutional $V_O$ sites in ZnO structures. The substitutional defects depend on the synthesis process. The characteristics outlined above may be generated from a system in which the primary material for ablation is a zinc nitride target and the ablation is carried out in an ethanol solution.

It is known that zinc nitride is not a particularly stable compound, especially in a liquid medium. Therefore, the C dopant may be incorporated into the QD crystal structure during the ablation process. The N atoms in the zinc nitride structure remain unstable and are easily replaced by O to form ZnO hexagonal crystals. At the same time, plenty of C is available during ablation because the laser breaks down the ethanol compound, releasing free radicals and incorporating C as dopant into the QD structure.

Figure 14:
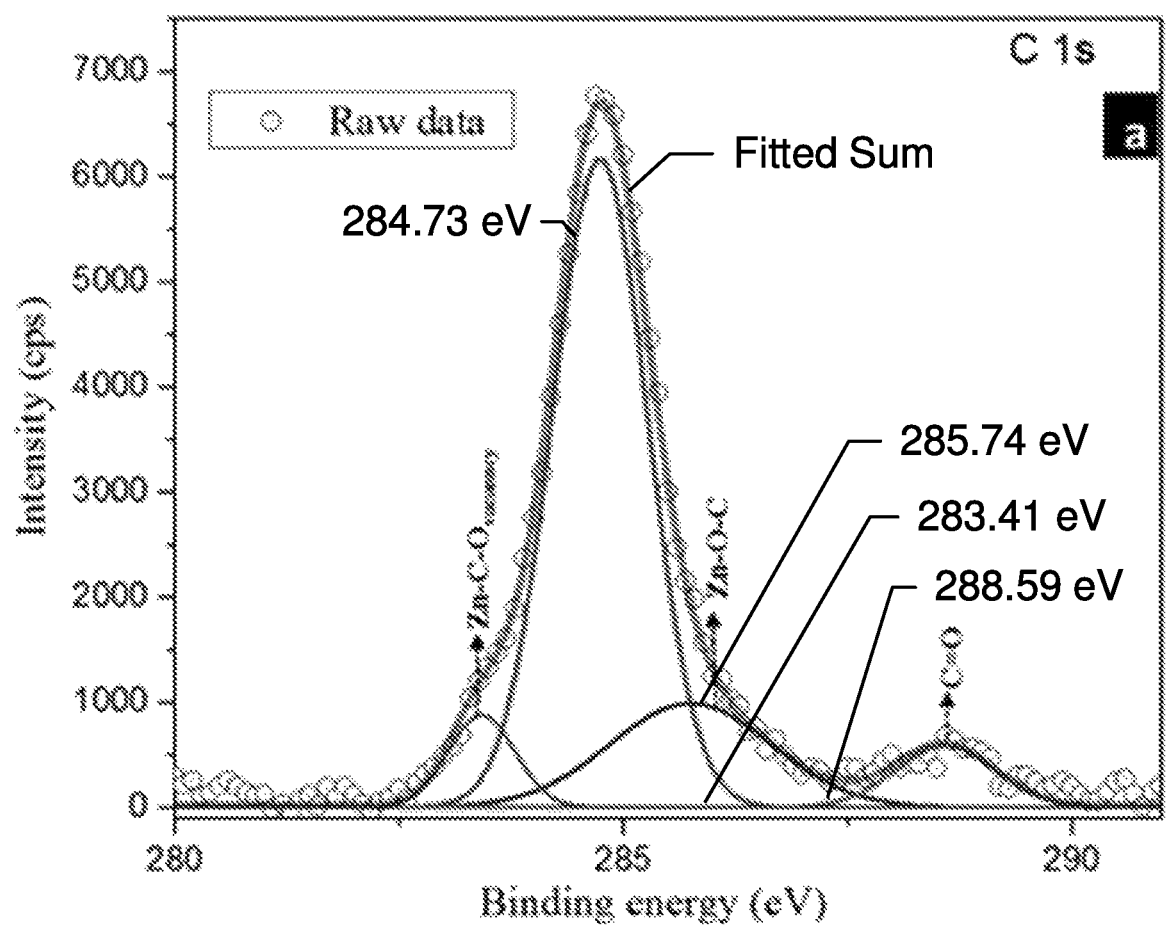
Figure 15:
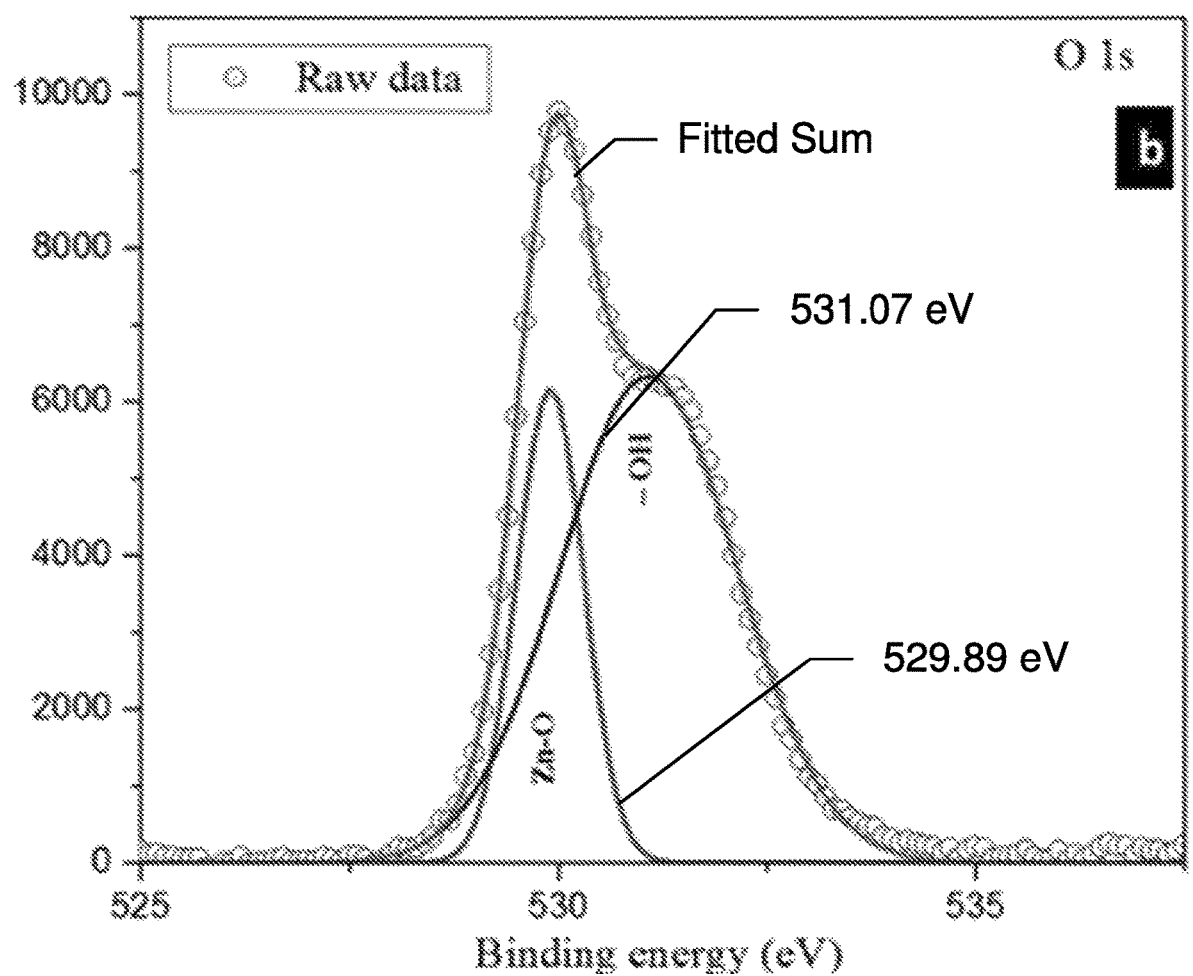

FIGS. 14 and 15 illustrate Core-level XPS spectra: FIG. 14 illustrates high-resolution XPS C is spectrum, and FIG. 15 illustrates O is spectrum of the C-doped ZnO QD samples.

X-ray photoelectron spectroscopy (XPS) revealed the chemical states of the doped atoms. More specifically, FIG. 14 shows the C is core-level spectrum, indicating a broad asymmetric peak. The peak is fitted by a Gaussian function, which is de-convoluted into four peaks. The asymmetric behavior of the peak implies presence of more than one chemical state of C. The lower binding energy peaks at 284.73 eV and 283.41 eV are attributed to pure graphitic C contamination and Zn—C—VO bonding, respectively. It further suggests the presence of C atoms in carbide form, indicating that C dopants occupy the substitutional anion sites and facilitate formation of Zn—C bonds in the C-doped ZnO QDs. The higher binding energy peaks at 285.75 eV and 288.59 eV are attributed to the Zn—O—C bond and the absorption of the C=O on the surface, respectively. The deconvolution of the O is peak in FIG. 15 reveals binding energies at 529.89 eV and 531.07 eV, which respectively correspond to the Zn—O bond and surface adsorption of —OH functional group. This result is confirmed by Fourier transform infrared spectroscopy (FTIR) measurements, as shown in FIG. 16.

Figure 16:
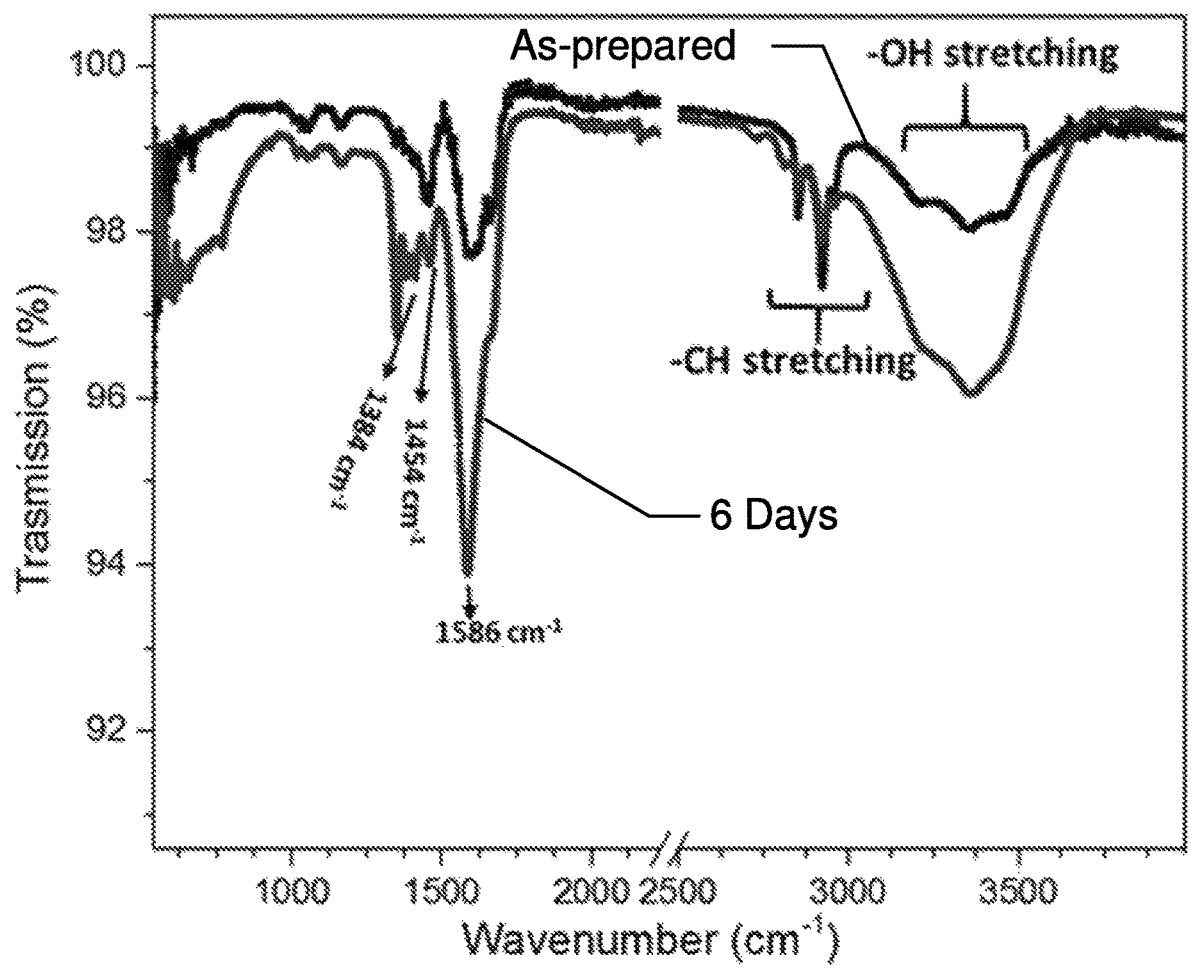

In order to verify the surface termination, FTIR analysis was carried out on as-prepared samples and the findings were compared to those pertaining to an aged sample, as shown in FIG. 16. FTIR spectra indicate that surface termination likely exists in the sample. FTIR spectra were obtained by employing attenuated total reflectance mode (ATR) in the 500-4000 cm$^{-1}$ wavelength range. The emergence of a broad band peak at 3200-3500 cm$^{-1}$ is observed, which is attributed to the presence of the hydroxyl on the material surface. Specifically, H—OH stretching contributes to the peak at 3435 cm$^{-1}$, while those noted at 3446 cm$^{-1}$ and 3500 cm$^{-1}$ correspond to the O—H stretching mode. This broad peak is enhanced in the spectrum pertaining to the aged sample, which was synthesized in ethanol, due to which —OH terminations gradually emerge at the particle surface over time. The symmetric and asymmetric C—H stretching nodes of —CH$_2$ group shown in FIG. 16 overlap with the broad signal pertaining to O—H group. The peaks located between 2800 cm$^{-1}$ and 3000 cm$^{-1}$ correspond to C—H stretching vibration of the alkane group. A very pronounced peak at 1586 cm$^{-1}$ is attributed to symmetric stretching of C=O (—R), indicating that a Zn-carboxylate termination is available on the surface of the nanocrystals. The shape of the 1586 cm$^{-1}$ peak changes due to ageing, which suggests that QD surfaces are gradually Zn—R terminated, where R represents COO—, C=O, etc. Asymmetrical stretching of Zn carboxylate is also observed at ~1630 cm$^{-1}$. The peaks located around 1454 cm$^{-1}$ and 1384 cm$^{-1}$ correspond to stretching and wagging of CH$_2$. This result confirms the contribution of carbon-related components and hydroxyl group on the surface of QDs. At the same time, FTIR spectrum suggests that QD surface-termination is of the —R type, which prevents further oxidation of the core level of the QDs.

Figure 17:
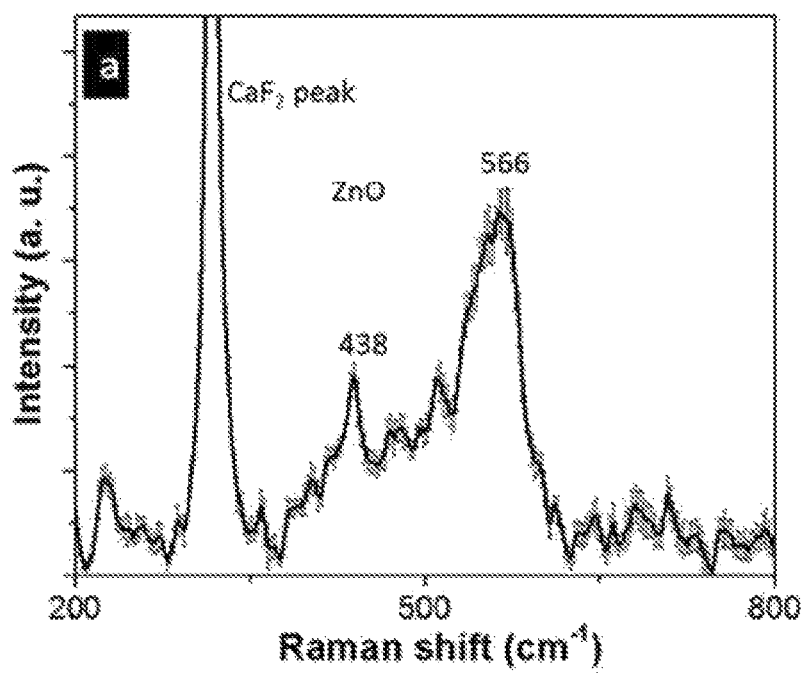
Figure 18:
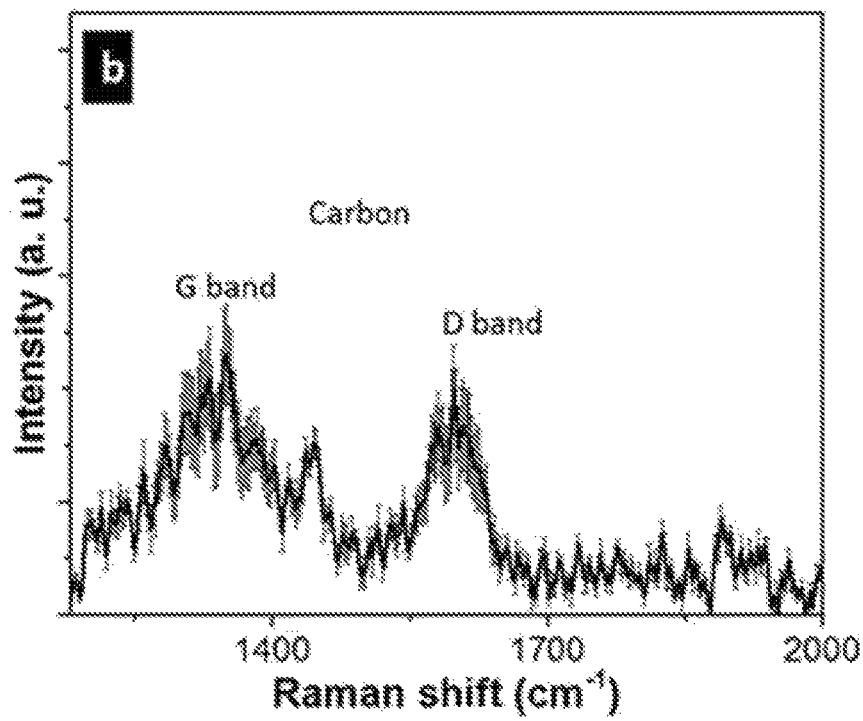

In addition, Raman spectrum of the QDs in the FIGS. 17 and 18 also confirm clear contribution of the ZnO QDs, C—H vibration and C-clusters which also complements TEM, XPS and FTIR results. FIGS. 17 and 18 depict the Raman spectra of C-doped ZnO quantum dots (QDs), where FIG. 17 illustrates Raman spectra originating from ZnO QDs, and FIG. 18 illustrates spectra showing presence of G and D band of carbon. All Raman measurements were performed using WiTec Raman system, equipped with 532 nm laser source, 100× objective, and 600 lines/mm grating. ZnO QDs were drop-casted and dried on calcium fluoride ($CaF_2$) substrate. Various Raman measurements were performed at different locations. The Raman spectra show a clear contribution of ZnO QDs, C—H vibration, and C-cluster. The sharp peak at around 317 $cm^{-1}$ is related to the Ca—F vibration of the substrate over which the ZnO QDs sample was drop-casted. The peak at 438 $cm^{-1}$ is attributed to the ZnO wurtzite structure, specifically to the $E_2$ (high) vibration mode of ZnO, as shown in FIG. 17. The second peak observed at 566 $cm^{-1}$ is attributed to the $E_1$ (LO) ZnO nanostructure mode. The peak corresponding to pure ZnO is attributed to the intrinsic defect states. The peak located in the lowering wavenumber is probably attributed to the Zn—C bonds.

The existence of C-related Raman-active modes of graphitic (G) and defect (D) bands was observed at 1350 cm-1 and 1600 cm-1, respectively, as shown in FIG. 18. The presence of Raman-active C-related modes confirms the existence of C—ZnO composite. This is also verified by the Fourier transform infrared spectroscopy (FTIR), as described hereinafter.

TEM and XPS results are also supported by the Raman results pertaining to C-doped ZnO QDs, as shown in the FIG. 16, suggesting the wurtzite ZnO structure along with the presence of C, which is also indicative of nanocomposite structure. Thus, the analysis provided herein demonstrates that ZnO QDs doped with C can be successfully prepared by FLAL synthesis from a zinc nitride target material, whereas all previously studied doped ZnO nano structures were prepared by chemical wet synthesis.

Figures 19, 20:
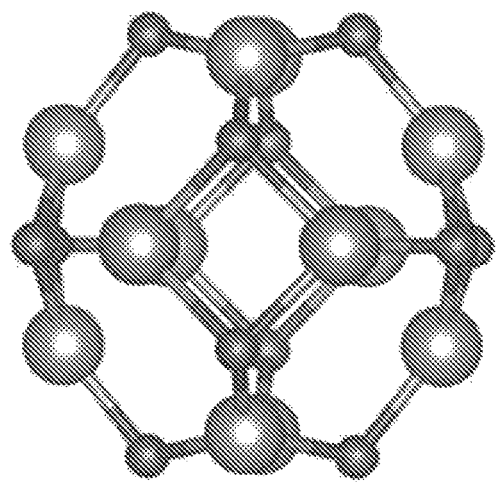
Figure 21:
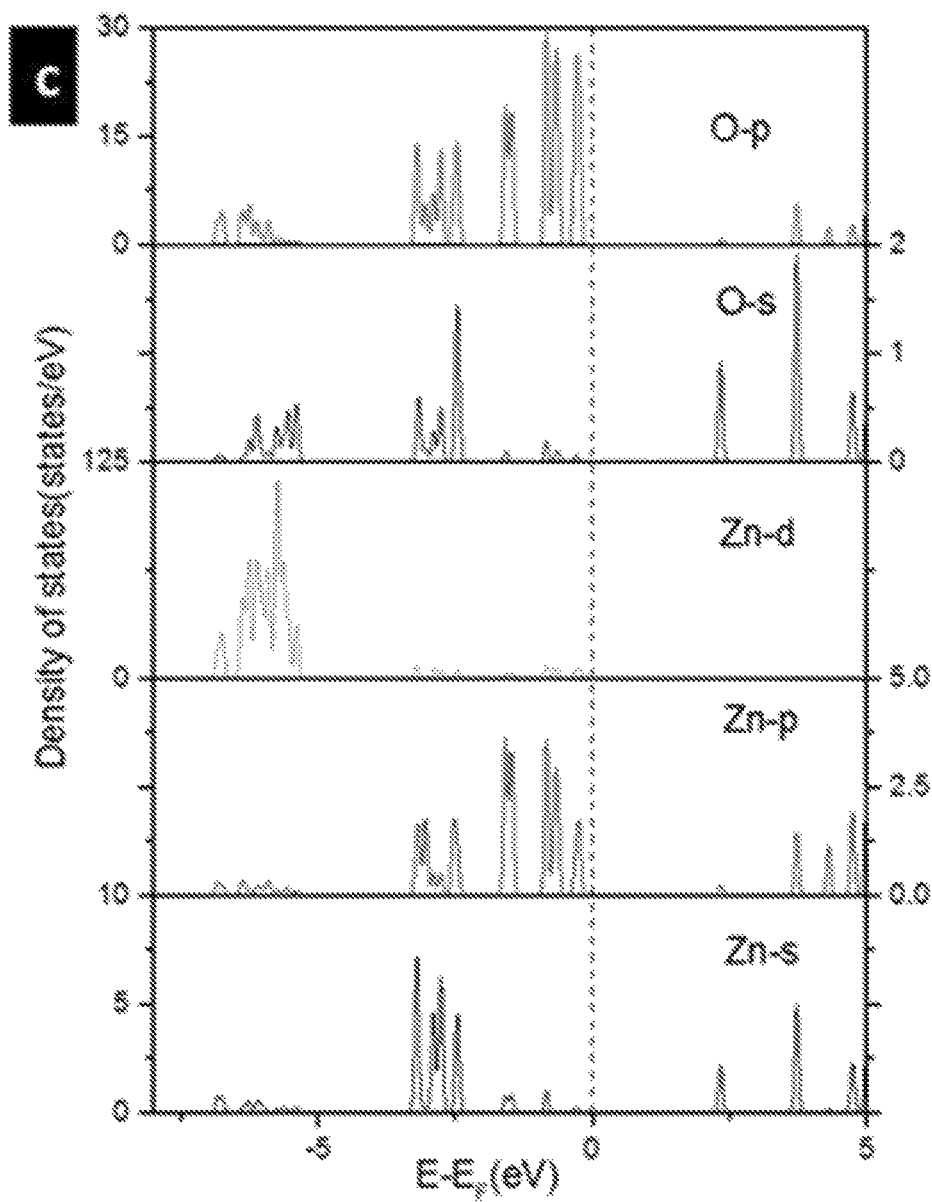
Figure 22:
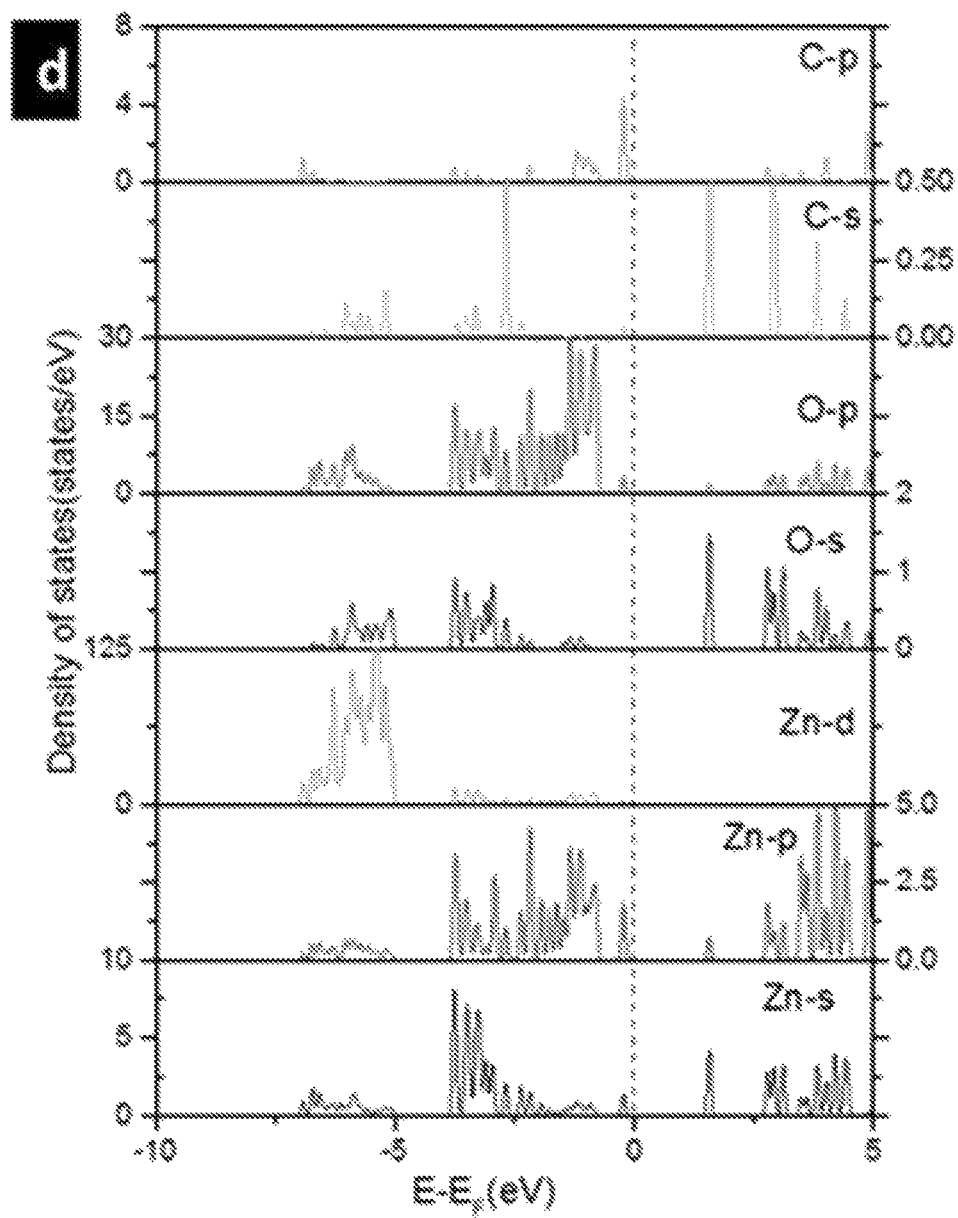

To elucidate the role played by C atoms in stabilizing the QD structure, a density functional theory (DFT) study was conducted, as noted previously. Referring now to FIGS. 19-22, FIG. 19 illustrates the optimized Zn12O12 cluster. The grey and red spheres indicate Zn and O atoms, respectively. FIG. 20 illustrates the formation energy of defects (Ef) in Zn12O12 cluster. FIG. 21 illustrates the density of states (DOS) of a Zn12O12 (corresponding to pure ZnO QDs), and FIG. 22 illustrates Zn12O10C1 (corresponding to C-doped ZnO QDs with the presence of VO defects) clusters.

More specifically, FIG. 19 shows a "magic" ZnO cluster (Zn12O12) with a hexagonal structure corresponding to the structure of ZnO QDs. Here, three scenarios are considered to elucidate the energetics of the point defect formation in the cluster, namely: (i) an O vacancy (VO), (ii) a carbon substituted to the O site (CO), and (iii) a (VO+CO) complex. The cluster for each case was optimized and calculated the formation energy (Ef) using the following equation:

$$Ef = E(D) - E(R) \pm n_i \mu_i$$

where the first term (E(D)) represents the total energy of the cluster containing defects, the second term (E(R)) denotes the total energy of the reference cluster without defects, and $n_i$ and $\mu_i$ are respectively the number and chemical potential of the defects that are added (–$n_i$) or removed (+$n_i$) from the cluster. The chemical potential was estimated as the energy per atom of the element in the most stable structure in this case, bulk Zn or molecular C and O.

The effect of charge states is not considered in the calculation of Ef, as no charged defects were added to the clusters. It was observed that the substitutional C (Ef=2.92 eV) is a preferable defect compared to VO (Ef=5.40 eV), as shown in FIG. 20. The presence of C in the ZnO cluster facilitates the formation of VO, creating C—VO complex in the nanoparticle structure as Ef is reduced from 2.92 eV to 1.88 eV by introducing VO in the vicinity of C in the Zn—C—VO bonding configuration, which substantiates the XPS results. The density of states (DOS) of the Zn12O12 (pristine ZnO) and Zn12O10C1 (ZnO doped with the C—VO complex) clusters was calculated for a qualitative comparison with the experimental results. The DOS of the Zn12O12 cluster (pure ZnO) shows that the p states of Zn and O are prominent and are located near the Fermi level (EF), while the Zn d state occurs deep inside the valence band as shown in FIG. 21.

The presence of C—VO complex in ZnO QD that the p states of C appear near EF, signifying the probability of hybridization of the O and Zn p states, as shown in FIG. 22. Remarkably, the d states of Zn and s states of C appear at the same energy levels, resulting in a strong s-d hybridization, which leads to a strong Zn—C bond, while also strengthening the stabilization of the C+VO defect complex in the cluster. As ZnO is intrinsically an n-type semiconductor, its Fermi level can be engineered by doping C in the structure. Prior research has reported C-doped ZnO films with high Hall mobility and hole concentrations. Furthermore, others have demonstrated that C doping in the ZnO structure reduces the chance of recombination, subsequently enhancing photocurrent generation. Consequently, carbon-doped nanostructures have been used in photocatalysis. Therefore, the expectation here is that C doping in ZnO QDs would indirectly influence photodetector device performance.

Figure 23:
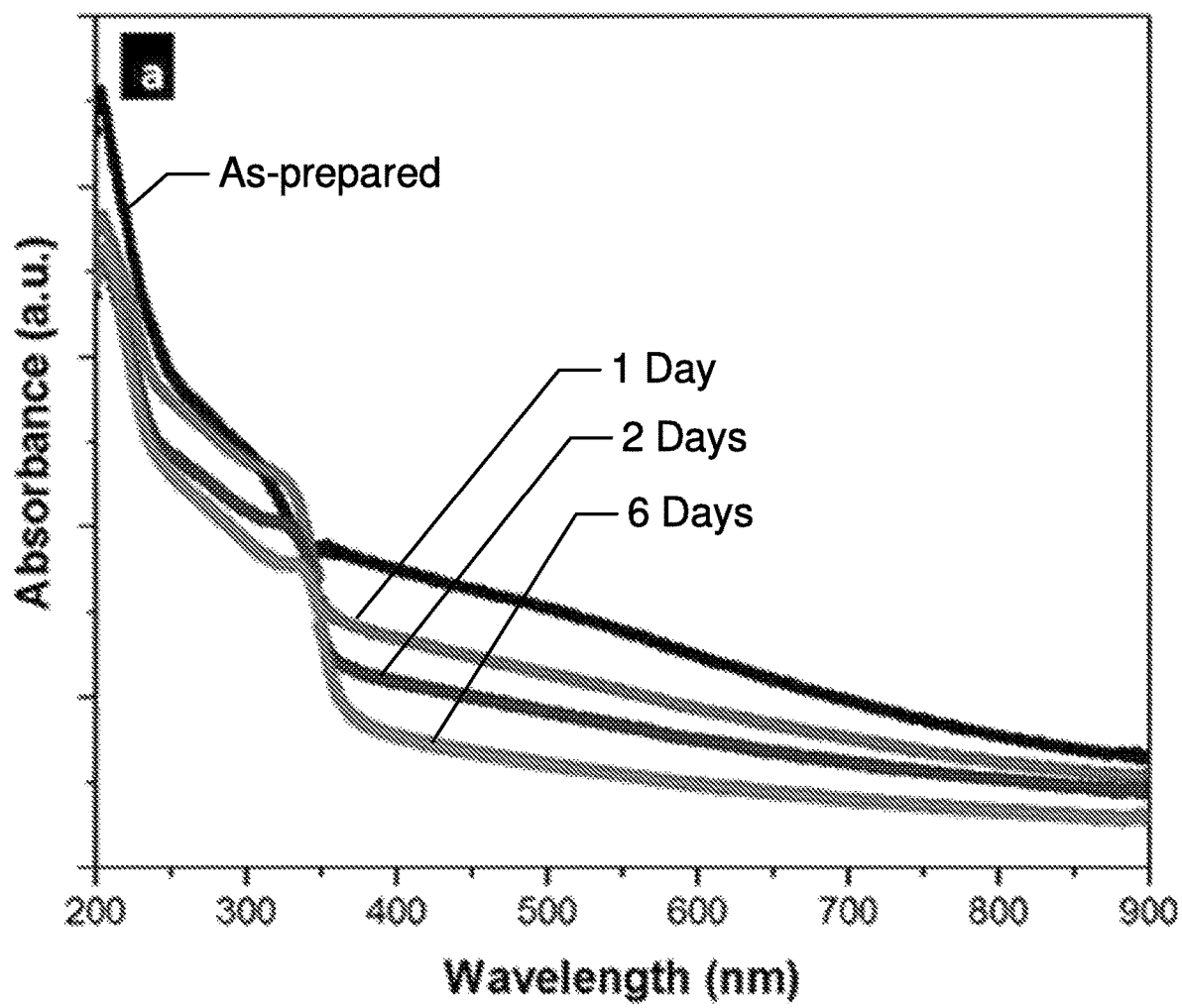
Figure 24:
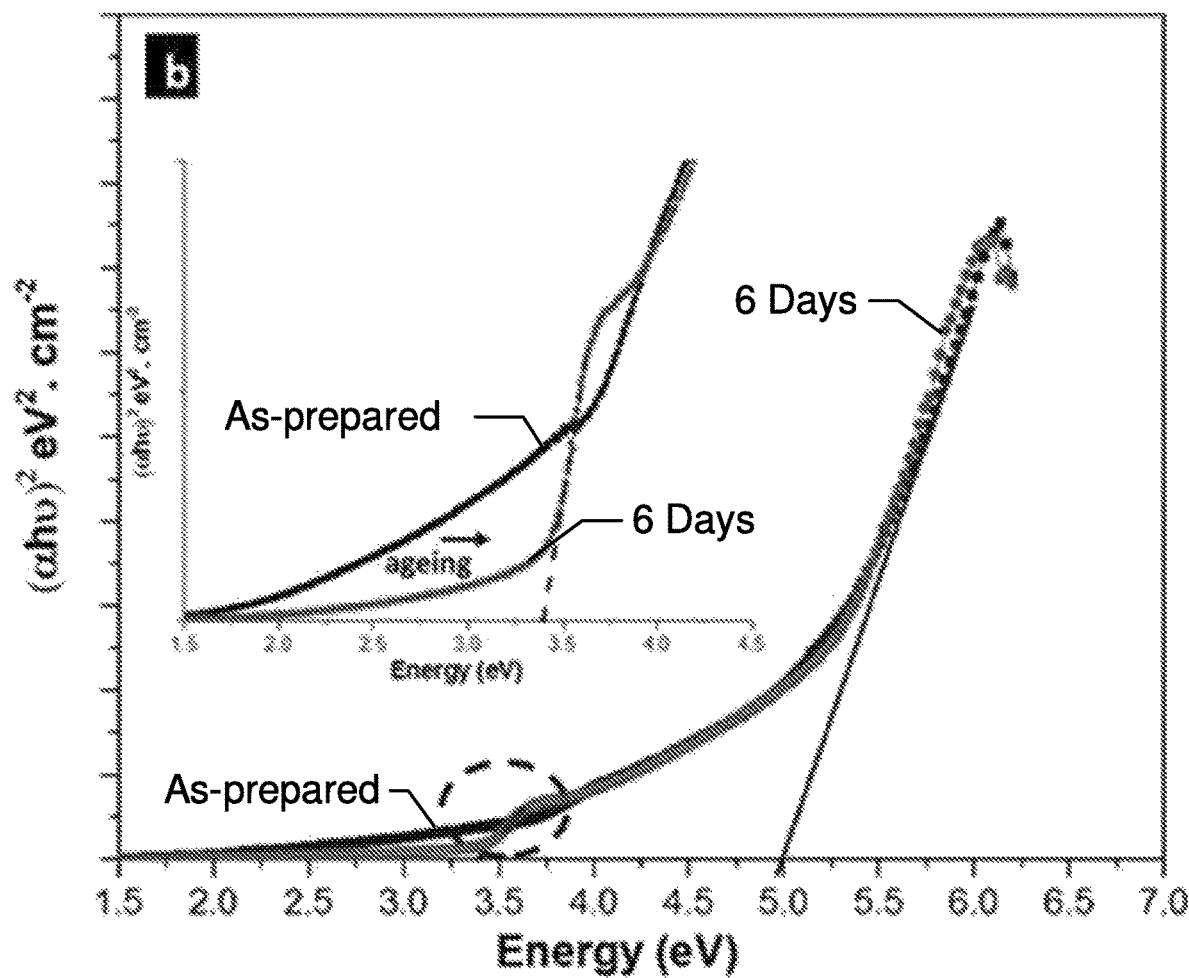

Referring now to FIGS. 23 and 24, absorption spectroscopy measurements were performed to investigate the change in the bandgap due to the change in the surface states (surface passivation over time). FIG. 23 illustrates the absorption spectra of QDs in ethanol over days of aging, and FIG. 24 illustrates tauc plot of the direct band gap of as-prepared QDs and after 6 days aging in ethanol. The inset in FIG. 24 shows the shoulder peak appears after ageing.

Optical absorption spectra were acquired from the colloidal solution of the QDs in ethanol. FIG. 23 shows the absorption spectra of the colloidal QDs over several days of ageing in ethanol. The spectrum of as-prepared sample does not show a pronounced absorption edge at bulk ZnO band gap at 3.64 eV. The measured band gap energy is observed at 4.9 eV as shown in FIG. 24. However, after ageing in ethanol, a shoulder peak (at 3.64 eV) related to ZnO bulk appears as shown clearly in the Tauc plot in FIG. 24. This shoulder peak is attributed to the surface oxidation of the QDs. The core of the as-prepared QDs has 0 deficiency, because the QDs are prepared from a zinc nitride target. Thus, the as-prepared sample exhibits higher absorption in the visible region compared to the aged samples, which have lower absorbance in the visible region. The higher-energy absorption edge in the visible region of the as-prepared samples is attributed to the C doping; however, the oxidation process leads to passivation, which reduces the absorption and results in a blueshift in the absorption edge of the aged samples over the investigated period. The passivation process on the surface of the QDs completely stabilized after six days, and no significant changes in the optical properties were observed for many months after that. The absorption results indicate superior stability and surface passivation of the QDs in colloidal form. Moreover, as a sharp absorption edge appears in the UV and DUV regime, this finding implies that C-doped ZnO QDs are suitable candidates for DUV detection, depending on their electrical properties. The average size of the QDs from the absorption measurements can be confirmed by using the hyperbolic band model.

It is estimated that the average particle size is 4.6 nm, which is close to the average size determined by TEM. The direct bandgap of the ZnO bulk at pH 7.5 is 3.63 eV (Ebulk). By examining the absorption spectra of the sample, average particle size can be estimated using the hyperbolic band model, as noted in the following equation:

$$d = 2\sqrt{\frac{2\pi^2 h^2 E_{bulk}}{m^*(E_N^2 - E_{bulk}^2)}}$$

where d is the nanoparticle diameter, m* is the effective mass of the sample (m*=29.15×10−31 kg for ZnO), his Planck's constant (6.626×10−34 J s) and EN denotes particle bandgap, which is estimated at 5 eV from the Tauc plot. The above equation yielded an average particle size of 4.6 nm, which is close to the average particle size measured from the TEM images.

Figure 25:
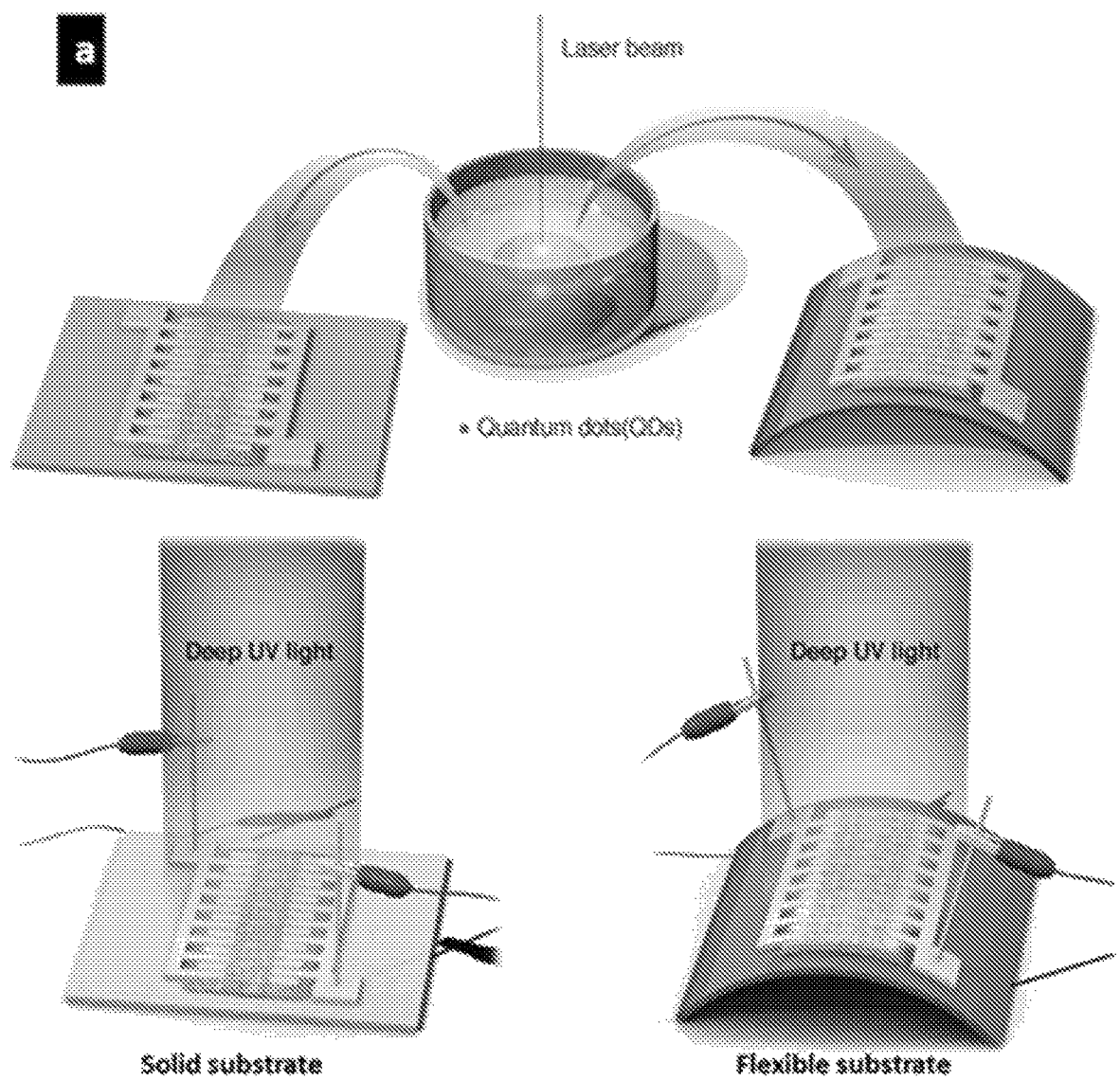
Figure 27:
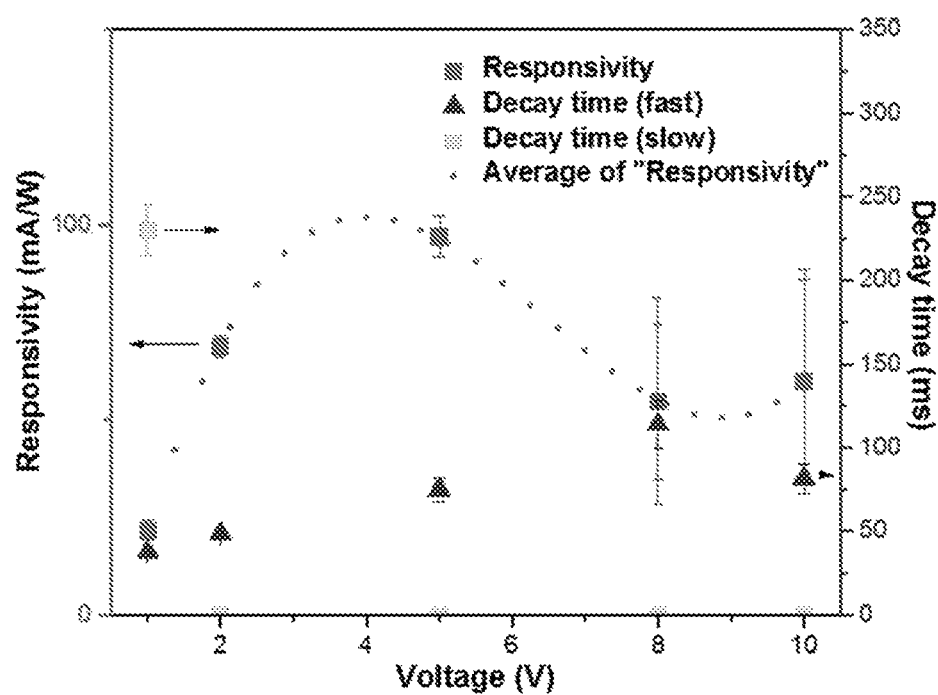

Referring now to FIGS. 25-27, FIG. 25 (upper panel) is a schematic illustration of FLAL synthesis with QDs coated on the interdigitated titanium electrode on rigid and flexible substrates. The (lower panel) photodetector devices are exposed to a 224.3 nm HeAg pulsed laser. The repetition rate of the laser pulse with a pulse width of 200 μs remains constant at 1 Hz throughout the photodetector measurements. FIG. 26 illustrates the transient photo-response of a device prepared by a drop-casting method on a SiO2 substrate at different bias voltages. FIG. 27 illustrates the responsivity (left axis) and the decay time (right axis) of the device as functions of bias voltage.

Referring now to FIG. 25, the schematic shows the steps and method of device preparation. FIG. 26 presents the transient photoresponse under pulsed DUV illumination at different bias voltages.

In some embodiments, colloidal nanoparticles in ethanol are coated on the electrode (e.g., an interdigitated titanium (Ti) electrode (ITD)) to produce photodetector devices. In some embodiments, such devices may be fabricated on rigid substrates (SiO$_2$ wafers), and in other embodiments, such devices may be frabricated on flexible substrates (PET).

The transient photoresponse of example photodetector devices (prepared by a drop-casting method on a SiO2 substrate) was measured under pulsed DUV illumination at different bias voltages. The laser excitation of the photodetector at 5.5 eV (224.3 nm) was well above that of the nanoparticle bandgap of 4.9 eV. Under pulsed laser illumination, at bias voltages of 1 V, 2 V and 5 V, the device exhibited a stable response over time, as illustrated in FIGS. 26 and 27.

For photodetector devices, it is very important to show a fast detection response. Therefore, the response time was examined. To calculate the response time, the curves shown in FIG. 26 needed to be fit. All the curves were fitted by an exponential function. The decay time at 1 V bias voltage exhibits double exponential response, as it has a fast (37.58 ms) and a slow (230 ms) component. For other bias voltages, the decay time follows a single exponential form. The decay and rise time in milliseconds indicates that devices created using example embodiments contemplated herein can work as an ultrafast photodetector. Accordingly, the cost effective devices generated based on the solution process contemplated herein provides both high performance and enables fabrication in flexible substrates and with high responsivity.

Because the visible light blindness of the photodetector can also be important, the response of the device under 325 nm laser illumination and white light (AM1.5G) illumination was checked. As it turns out, the responsivity of examples generated in accordance with example embodiments described herein is 100 times lower than that of a historically generated deep ultraviolet photodetector.

Figure 28:
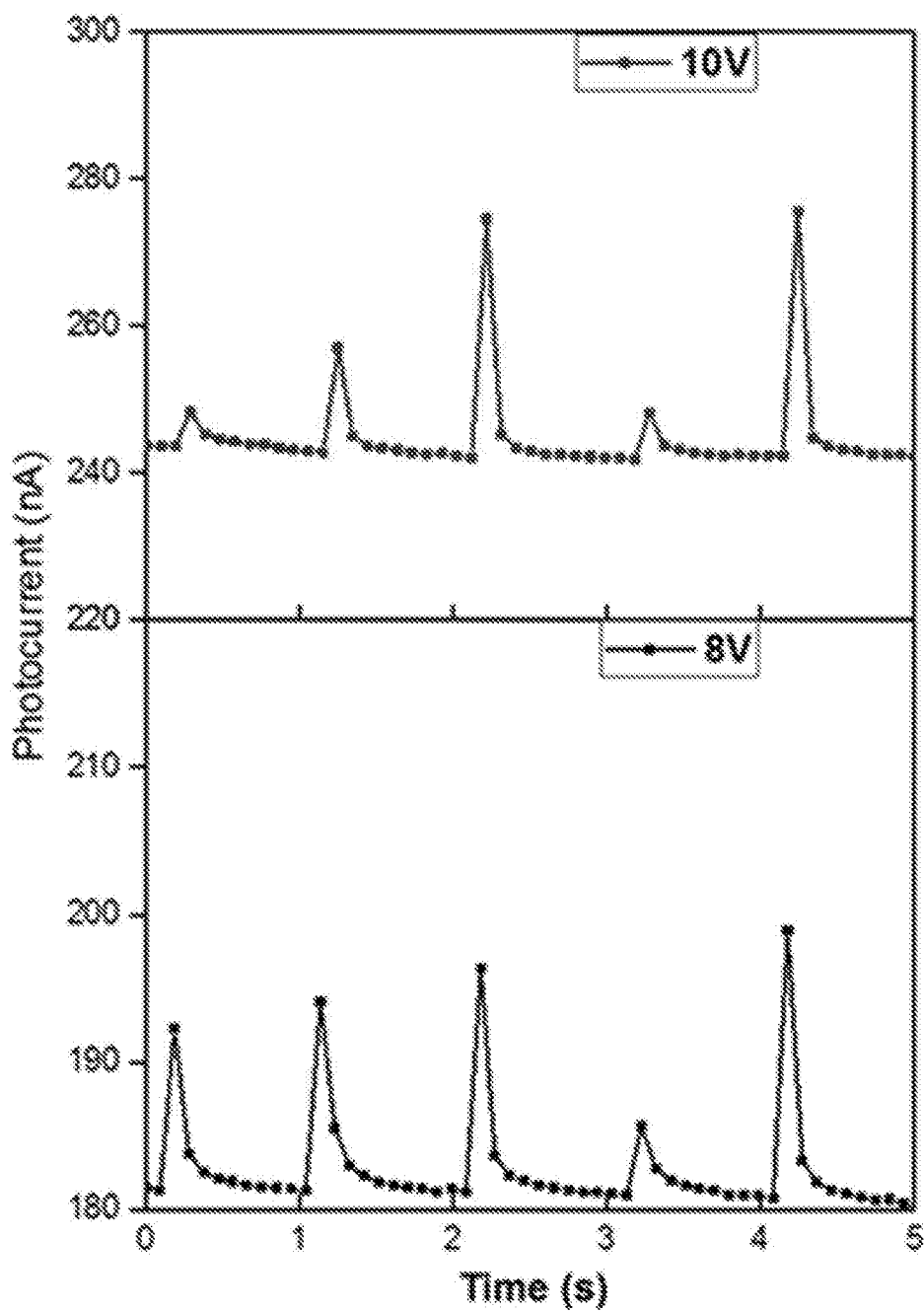

FIG. 28 shows photo-response under pulsed DUV illumination at different bias voltages under illumination of 224 nm (5.5 eV) pulsed laser with energy, which is well above the 4.9 eV bandgap of the QDs. Photodetector responses obtained under different bias voltages revealed that, at lower bias, the response is much more stable, as shown in FIG. 27. Under pulsed laser illumination, at 1 V, 2 V and 5 V bias, a very stable response over time is obtained. This stability does not persist at higher bias voltages (>5 V), as the transient photocurrent changes at different times, as shown in FIG. 28. At 2 V and 5 V, fast response (in ms) is observed, with higher responsivity (up to ~100 mA/W) compared to that measured at 1 V.

Figure 29:
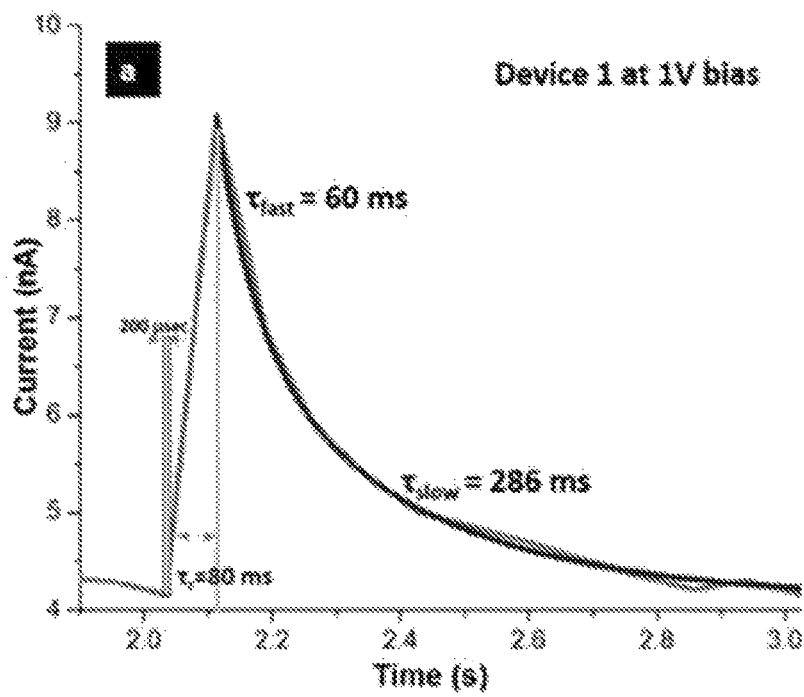
Figure 30:
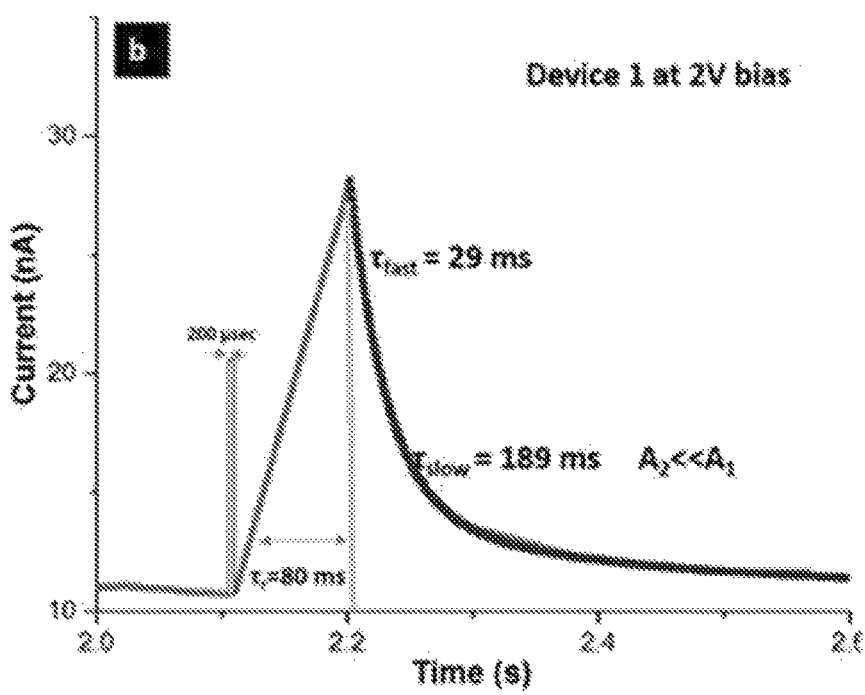

FIGS. 29 and 30 show the fitting of the decay time at different bias voltages for the device shown in FIGS. 26 and 27. The fitting procedure adopted to measure the decay time is in line with that used by others. The decay curve has been fitted by exponential function Iph=A1*exp(−t/τslow)+A2*exp(−t/τfast)+Ioffset, where Iph is the photo current, A1 and A2 are coefficients, t denotes the time, τslow and τfast are the slow and fast respective time constants, and Ioffset is the current offset level. At 1 V bias, the contribution from the slow (τslow) and the fast component (τfast) and the respective values of A1 and A2 are comparable. However, at a higher bias voltage (FIG. 30), A2<<A1 indicates that the τfast component dominates, due to which the decay time declines rapidly. The rise time corresponds to the change in current from 0 to 100% and was calculated at 80 ms.

The instability of the photoresponse at higher voltage bias can be attributed to the unstable Schottky junction between the QDs and the metal electrodes. FIG. 27 presents a comparison of the decay time and the responsivity of device shown in FIG. 26 at different voltages. The decay time at 1 V bias voltage has a double exponential response with fast (37.58 ms) and slow (230 ms) components. The decay time for the bias voltages above 1V has a single exponential response.

Fitting of the rise time and the decay time is illustrated in FIGS. 29 and 30. At higher bias voltages (2 V, 5 V, etc.), the device shows ultrafast response (the slow component disappeared) compared with the DUV devices based on films, as well as nanoparticles. The device shown in FIGS. 26 and 27 works optimally in the 2-5 V range due to its very high responsivity, its fast response time and its significant stability in this voltage regime.

Figure 33:
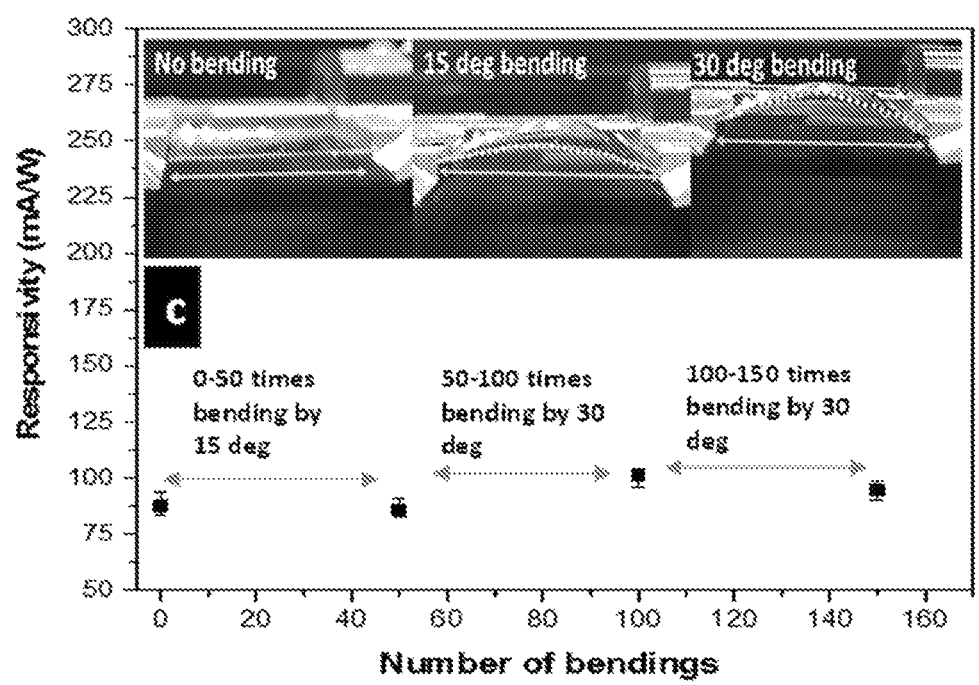
Figure 34:
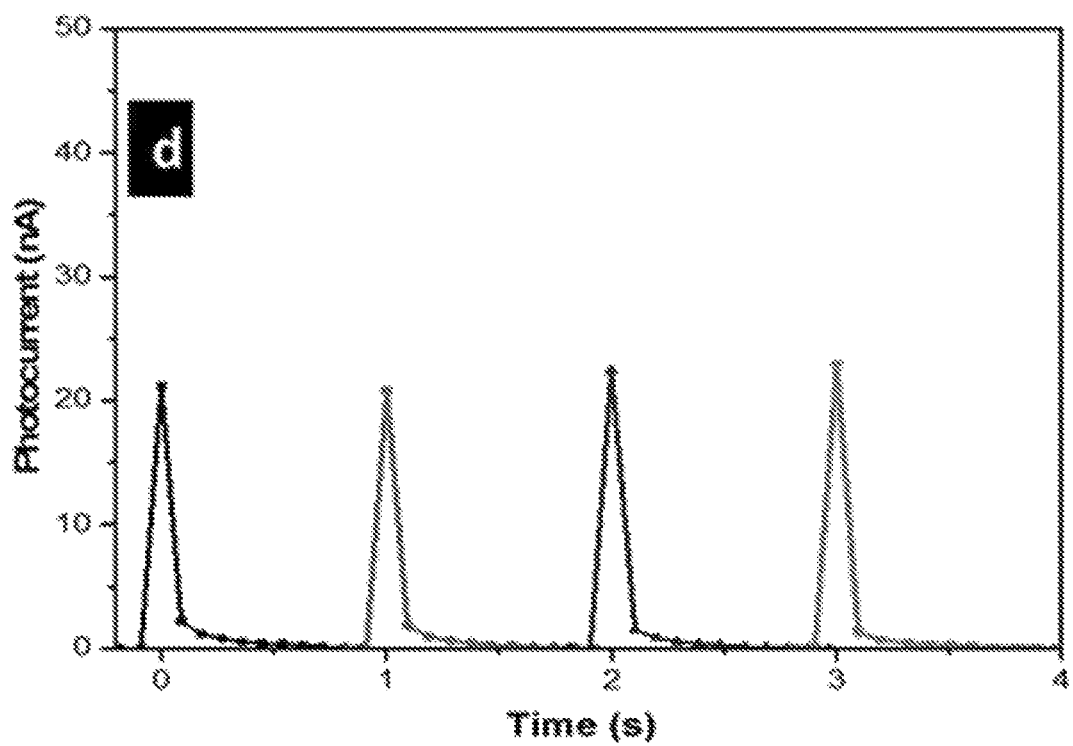

Referring now FIGS. 31-34, FIG. 31 illustrates transient photocurrent generation under DUV illumination for a device prepared on a rigid substrate with the airbrush spray-coating technique. The average responsivity is 295±4 mA/W at 5 V bias voltage. FIG. 32 illustrates transient photocurrent generation under DUV illumination for the device shown in FIG. 32 (the flexible PET substrate with the airbrush spray-coating technique). The average responsivity is 88.4±0.7 at 5 V bias. FIG. 33 illustrates responsivity measurement of this device as a function of the number of bending. The inset photos show this device bending. FIG. 34 illustrates photocurrent generation after various numbers of bending at certain degree angle.

As noted above, an airbrush spray-coating technique was used to fabricate the devices shown in FIG. 31 (on a $SiO_2$ substrate) and FIG. 32 (on a flexible substrate), because spray coating is a simple and cost-effective method and can be more effective that drop-casting method for device fabrication. FIG. 31 shows that the photocurrent generation of its device, with an average responsivity of 295±4 mA/W, which is higher than that of the device shown in FIGS. 26 and 27. The transient photoresponse of the device shown in FIG. 32 indicates a responsivity of 88.4±0.7 at 5 V bias. The responsivity values of the three devices are the highest achieved to date in solution-processed QD-based DUV photodetectors. Moreover, they are superior to those of state-of-the-art UV photodetectors, including the commercial products, as described in detail hereinafter.

FIG. 33 shows the responsivity of the flexible device from FIG. 32 after 150 cycles of bending at a certain degree angle (up to 30°) (the photographs in FIG. 33 show the bending setup used for this measurement), indicating that the device is immune to stress and its performance is not affected by bending process. FIG. 34 shows the transient photoresponse as a function of the number of bending cycles, which further confirms that photocurrent generation remains unchanged after even 150 cycles of bending. These results demonstrate the excellent photoelectrical stability of this nanoparticle-based flexible DUV photodetector device. For the devices shown in FIGS. 31 and 32, the response time (rise time and decay time) remains below than 85 ms in the 2-5 V range, which is as fast as previously reported results of solution-processed NANOPARTICLE-based DUV devices and also faster than thin film DUV photodetectors. Visible blindness characteristics are crucial in DUV photodetectors. To confirm the visible blindness of the photodetector, we studied the device response under 325 nm laser illumination and white light (AM1.5G) illumination. The obtained results indicated that the UV and the visible light responsivity was more than 100 times lower than the DUV responsivity of our devices.

To further illustrate the various technical advantages of devices fabricated in accordance with embodiments of the present invention, Table 1 below lists some results reported in pertinent studies and the responsivity of the different devices described therein, in comparison with the responsivity of an embodiment of the present invention. In particular, the bottom row of Table 1 illustrates an example embodiments described herein (a Schottky junction photodetector fabricated using the spray coating technique) that exhibited a response parameter of 295 mA/W @ 224 nm. Table 1 also shows a comparison of UV/DUV photodetectors fabricated by different methods, along with their responsivity at a specific wavelength.

TABLE 1

Comparison of high-performance photodetectors operating in the UV-C region (≤300 nm)

| Photodetector | Type | R (mA/W) @ λ (nm) | Fabrication method |
|---|---|---|---|
| Gr/GQD/Gr3 | Schottky | 50@300 | Solution processed |
| Gr/SiC/Gr4 | Schottky | 9.7@254 | Ultra-high vacuum process |

TABLE 1-continued

Comparison of high-performance photodetectors operating in the UV-C region (≤300 nm)

| Photodetector | Type | R (mA/W) @ λ (nm) | Fabrication method |
|---|---|---|---|
| P + N/Si5 | p-n junction | 100@200 | CVD deposition |
| UV Si (S1226-BQ series) In Hamamatsu, Jap.) | p-n junction | 130@200 120@300 | Non-solution processed |
| SiC-based (ST-ABC-M) | Schottky | 130@280 | Non-solution processed |
| Al2O3/Gr/Si6 | Schottky | 190@200 140@250 | e-beam evaporation, photolithography |
| Graphene QDs7 | Schottky | 2.1@254 | Solution processed |
| One Embodiment of the Present Invention | Schottky | 295@224 | Solution processed (spray coating) |

Table 2 below shows the results of systems structured in accordance with embodiments of the present invention:

TABLE 2

Characteristics of Deep Ultraviolet Photodetector fabricated using systems structured in accordance with embodiments of the present invention

| No. | Material | Responsivity | Time | Wavelength | Process Involved |
|---|---|---|---|---|---|
| a | ZnO QDs by FLA synthesis | 295 mA/W | less than 80 ms | 224 nm laser | Solution processed |

It can be noted that most of the deep ultraviolet photodetector devices developed by others required a costly fabrication procedure. The comparison between results show in Table 1 and Table 2 illustrate that the processing and fabrication methods described herein produces high quality quantum dots that are efficient for high performance photodetectors, and therefore represent an advance over procedures historically used for developing these types of devices.

Ultraviolet and White Light-Emitting Diodes (LEDs)

In some embodiments, the optoelectronic devices fabricated in accordance with claimed invention can be cost-effective bright white light LEDs based on nanoparticles such as quantum dots. Currently available white LEDs are fabricated using very expensive GaN materials that require costly fabrication methods, such as metal-organic chemical vapor deposition (MOCVD) and molecular beam epitaxy (MBE). The final product is very expensive and is affected by threading dislocation defects arising from lattice mismatch substrate. In contrast, in white light LED embodiments described herein, the techniques described above for generation of nanoparticles and fabrication of an electrode using the nanoparticles are employed to produce white light emission more efficiently at a lower cost than historical methods. In this regard, FIG. 35 illustrates the emission of an example white emitting LED generated in this manner. FIG. 36 illustrates photoluminescence information regarding the example white light LED. FIG. 37 illustrates the I-V curve of the example white light LED. Finally, FIG. 38 shows the structure of the example white LED.

CONCLUSION

Many modifications and other embodiments of the inventions set forth herein will come to mind to one skilled in the That which is claimed:

1. A system for synthesizing and manufacturing nanoparticles from a plurality of targets, the system comprising:
    a laser beam generator configured to generate a laser beam;
    a plurality of synthesis chambers, each housing a target submerged in a synthesis solvent;
    for each particular synthesis chamber of the plurality of synthesis chambers, a level sensor configured to detect an actual liquid level of the particular synthesis chamber; and
    a set of beam splitters arranged to split a laser beam generated by the laser beam generator into a plurality of derivative laser beam portions directed towards corresponding targets,
    wherein interaction of each portion of the derivative laser beam portions with its corresponding target releases nanoparticles into the corresponding synthesis solvent to create a nanoparticle solution including both the corresponding synthesis solvent and the released nanoparticles.

2. The system of claim 1, wherein the laser beam has a wavelength ranging from ultraviolet radiation to infrared radiation and a pulse repetition rate ranging from kHz to MHz.

3. The system of claim 1, wherein the plurality of targets are selected from the group consisting of organic material and inorganic material.

4. The system of claim 1, further comprising:
    a collection chamber connected to one or more of the synthesis chambers to receive nanoparticle solution from at least one of the plurality of synthesis chambers.

5. The system of claim 4, further comprising:
    components configured for depositing the collected nanoparticle solution on a substrate.

6. The system of claim 5, wherein the components configured for depositing the collected nanoparticle solution on the substrate comprise components configured for spray-coating, dip-coating, or spin-coating the substrate with the nanoparticle solution.

7. The system of claim 4, further comprising:
    an evaporation chamber configured to evaporate solvent from a nanoparticle solution to leave a nanoparticle powder residue, the evaporation chamber connected to at least one of the plurality of synthesis chambers by a conduit controlled by a collection end valve.

8. A system for synthesizing and manufacturing nanoparticles from a plurality of targets, the system comprising:
    a laser beam generator configured to generate a laser beam;
    a plurality of synthesis chambers, each housing a target submerged in a synthesis solvent;
    a set of beam splitters arranged to split a laser beam generated by the laser beam generator into a plurality of derivative laser beam portions directed towards corresponding targets,
    wherein interaction of each portion of the derivative laser beam portions with its corresponding target releases nanoparticles into the corresponding synthesis solvent to create a nanoparticle solution including both the corresponding synthesis solvent and the released nanoparticles;
    a non-transitory memory storing an indication of a desired liquid level of each synthesis chamber; and
    for each particular synthesis chamber of the plurality of synthesis chambers:
        a level sensor configured to detect an actual liquid level of the particular synthesis chamber, and
        a release value configured to cause synthesis solvent to flow into the particular synthesis chamber until the actual liquid level of the particular synthesis chamber reaches a corresponding desired liquid level.

9. A system for synthesizing and manufacturing nanoparticles from a plurality of targets, the system comprising:
    a laser beam generator configured to generate a laser beam;
    a plurality of synthesis chambers, each housing a target submerged in a synthesis solvent;
    a set of beam splitters arranged to split a laser beam generated by the laser beam generator into a plurality of derivative laser beam portions directed towards corresponding targets,
    wherein interaction of each portion of the derivative laser beam portions with its corresponding target releases nanoparticles into the corresponding synthesis solvent to create a nanoparticle solution including both the corresponding synthesis solvent and the released nanoparticles; and
    a power meter disposed in a position enabling the power meter to monitor a power of the laser beam,
    wherein the laser beam generator is further configured to, in an instance in which the power of the laser beam deviates from a target power level by a predetermined threshold, adjust the power of the laser beam until the power of the laser beam matches the target power level.

10. The system of claim 8, wherein the laser beam has a wavelength ranging from ultraviolet radiation to infrared radiation and a pulse repetition rate ranging from kHz to MHz.

11. The system of claim 8, wherein the plurality of targets are selected from the group consisting of organic material and inorganic material.

12. The system of claim 8, further comprising:
    a collection chamber connected to one or more of the synthesis chambers to receive nanoparticle solution from at least one of the plurality of synthesis chambers.

13. The system of claim 12, further comprising:
    components configured for depositing the collected nanoparticle solution on a substrate.

14. The system of claim 13, wherein the components configured for depositing the collected nanoparticle solution on the substrate comprise components configured for spray-coating, dip-coating, or spin-coating the substrate with the nanoparticle solution.

15. The system of claim 13, further comprising:
    an evaporation chamber configured to evaporate solvent from a nanoparticle solution to leave a nanoparticle powder residue, the evaporation chamber connected to at least one of the plurality of synthesis chambers by a conduit controlled by a collection end valve.

16. The system of claim 9, wherein the laser beam has a wavelength ranging from ultraviolet radiation to infrared radiation and a pulse repetition rate ranging from kHz to MHz.

17. The system of claim 9, wherein the plurality of targets are selected from the group consisting of organic material and inorganic material.

18. The system of claim 9, further comprising:
   a collection chamber connected to one or more of the synthesis chambers to receive nanoparticle solution from at least one of the plurality of synthesis chambers.

19. The system of claim 18, further comprising:
   components configured for depositing the collected nanoparticle solution on a substrate.

20. The system of claim 19, wherein the components configured for depositing the collected nanoparticle solution on the substrate comprise components configured for spray-coating, dip-coating, or spin-coating the substrate with the nanoparticle solution, and further comprising an evaporation chamber configured to evaporate solvent from a nanoparticle solution to leave a nanoparticle powder residue, the evaporation chamber connected to at least one of the plurality of synthesis chambers by a conduit controlled by a collection end valve.

* * * * *